(12) United States Patent
Yasui

(10) Patent No.: US 11,835,696 B2
(45) Date of Patent: Dec. 5, 2023

(54) OPTICAL SYSTEM AND PROJECTOR

(71) Applicant: SONY CORPORATION, Tokyo (JP)

(72) Inventor: Toshifumi Yasui, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 499 days.

(21) Appl. No.: 17/044,421

(22) PCT Filed: Mar. 18, 2019

(86) PCT No.: PCT/JP2019/011124
§ 371 (c)(1),
(2) Date: Oct. 1, 2020

(87) PCT Pub. No.: WO2019/198432
PCT Pub. Date: Oct. 17, 2019

(65) Prior Publication Data
US 2021/0033830 A1 Feb. 4, 2021

(30) Foreign Application Priority Data
Apr. 9, 2018 (JP) ................................. 2018-074754

(51) Int. Cl.
*G02B 13/16* (2006.01)
*G02B 13/18* (2006.01)
*G03B 21/14* (2006.01)

(52) U.S. Cl.
CPC ............. *G02B 13/16* (2013.01); *G02B 13/18* (2013.01); *G03B 21/147* (2013.01)

(58) Field of Classification Search
CPC ........ G02B 13/16; G02B 13/18; G02B 17/08; G02B 27/1006; G02B 27/283; G03B 21/147; G03B 21/14
See application file for complete search history.

(56) References Cited

U.S. PATENT DOCUMENTS

2010/0053737 A1* 3/2010 Fujita ................. G02B 17/0852
359/364
2015/0293434 A1* 10/2015 Matsuo .................. G02B 7/028
353/101

(Continued)

FOREIGN PATENT DOCUMENTS

CN 107209607 A 9/2017
JP 2005-283658 A 10/2005

(Continued)

OTHER PUBLICATIONS

International Search Report and Written Opinion of PCT Application No. PCT/JP2019/011124, dated May 14, 2019, 07 pages of ISRWO.

(Continued)

*Primary Examiner* — Magda Cruz
(74) *Attorney, Agent, or Firm* — CHIP LAW GROUP

(57) ABSTRACT

An optical system of the present disclosure includes a projection optical system, an optical path splitting unit, and a detection optical system. The projection optical system includes a plurality of lenses and projects, on a projection surface, an image generated by a light valve. A detection object is on side of the projection surface, and object light is incident from the side of the projection surface. The optical path splitting unit is on the side of the projection surface relative to one of the plurality of lenses most adjacent to the light valve. The detection optical system includes at least one lens between an imaging device and the optical path splitting unit. The object light is incident through the optical path splitting unit on the detection optical system.

18 Claims, 15 Drawing Sheets

EXAMPLE 2

(56) References Cited

U.S. PATENT DOCUMENTS

| | | | | |
|---|---|---|---|---|
| 2015/0323767 A1* | 11/2015 | Morikuni | ................ | G02B 9/64 |
| | | | | 359/433 |
| 2017/0059836 A1* | 3/2017 | Takano | ................ | G03B 21/008 |
| 2017/0228057 A1* | 8/2017 | Kaneda | ................ | G06F 3/005 |
| 2017/0285451 A1* | 10/2017 | Uchida | ................ | G02B 13/16 |
| 2018/0011606 A1 | 1/2018 | Yasui | | |
| 2019/0354234 A1 | 11/2019 | Yasui | | |
| 2021/0055507 A1* | 2/2021 | Kaneda | ................ | G02B 13/22 |

FOREIGN PATENT DOCUMENTS

| | | | |
|---|---|---|---|
| JP | 2016-057363 A | | 4/2016 |
| JP | 2016-057426 A | | 4/2016 |
| JP | 2016-220080 A | | 12/2016 |
| JP | 2017-167180 A | | 9/2017 |
| JP | 2018060131 A | * 4/2018 | ............ G02B 13/16 |
| JP | 2018-074754 A | | 5/2018 |
| JP | 6787135 B2 | | 11/2020 |
| WO | 2017/014317 A1 | | 1/2017 |

OTHER PUBLICATIONS

Extended European Search Report of EP Application No. 19784456.6, dated Apr. 15, 2021, 06 pages.

\* cited by examiner

[FIG. 1]
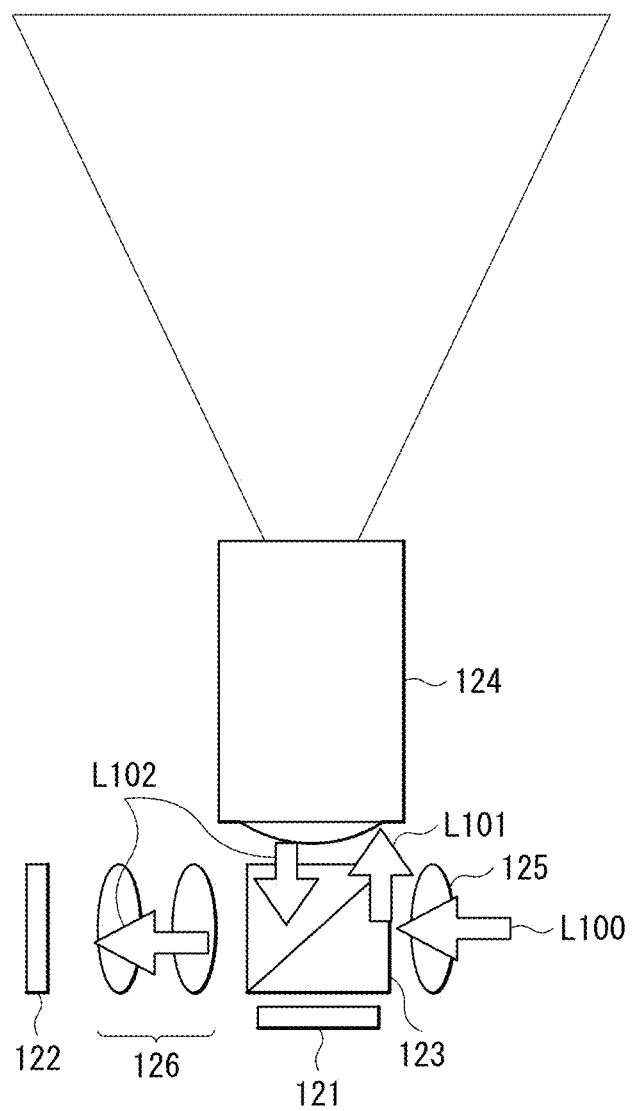

[FIG. 2]
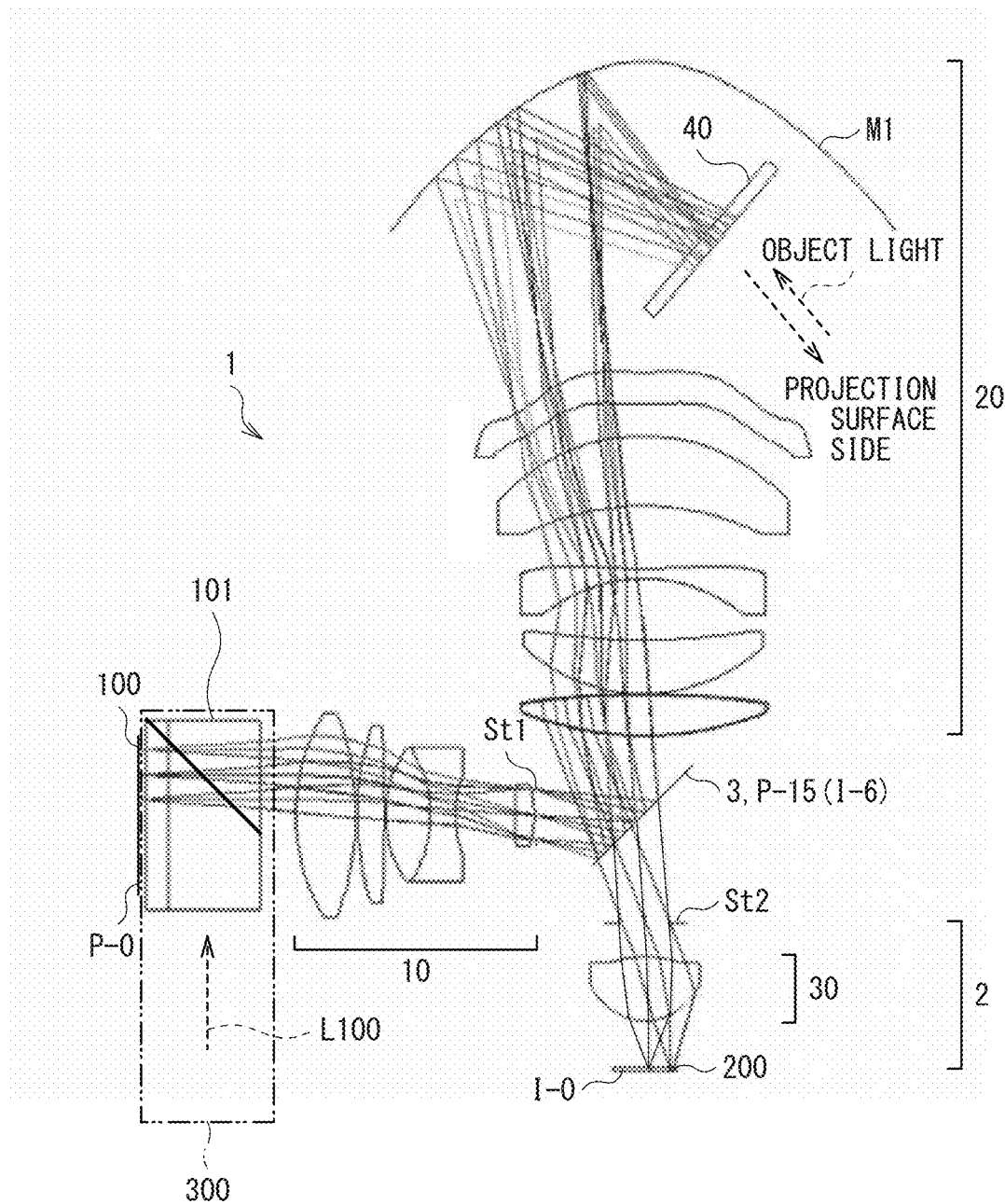
EXAMPLE 1

[FIG. 3]
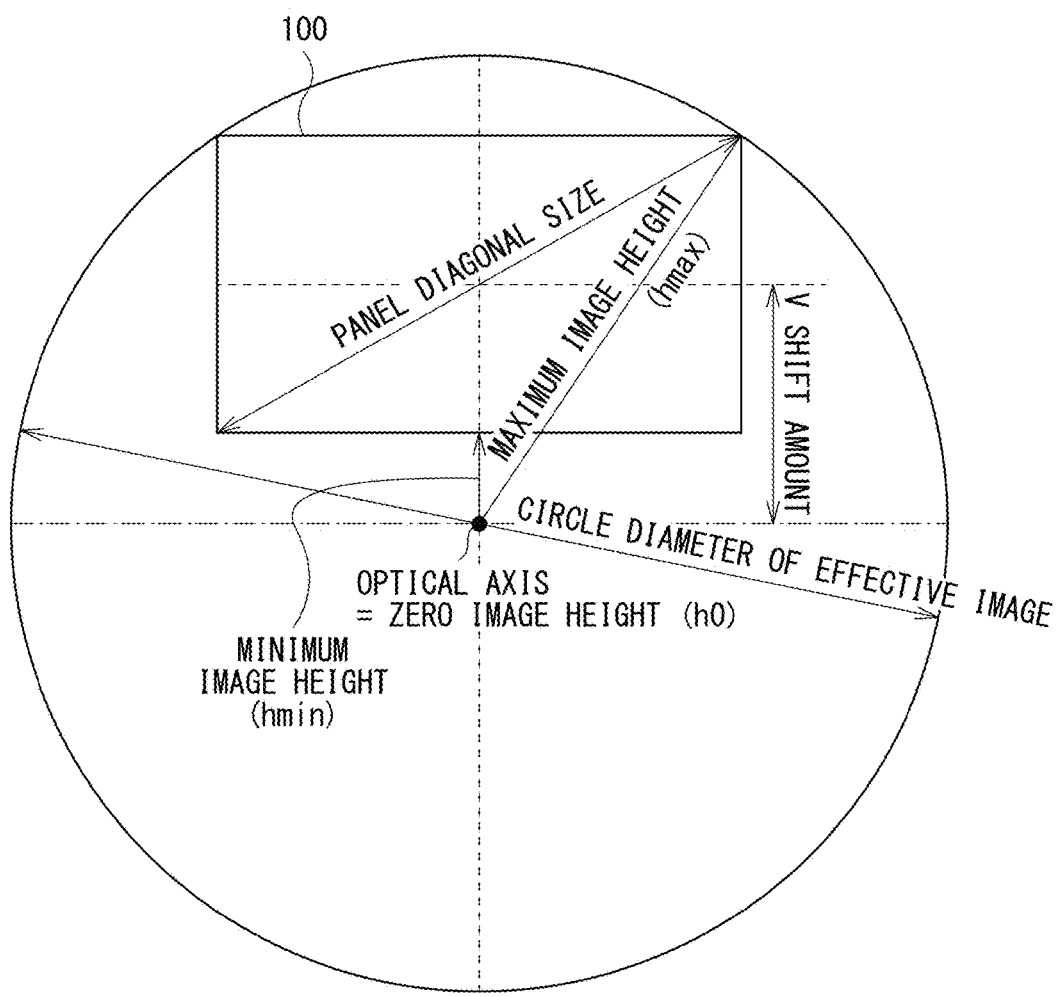

[FIG. 4]
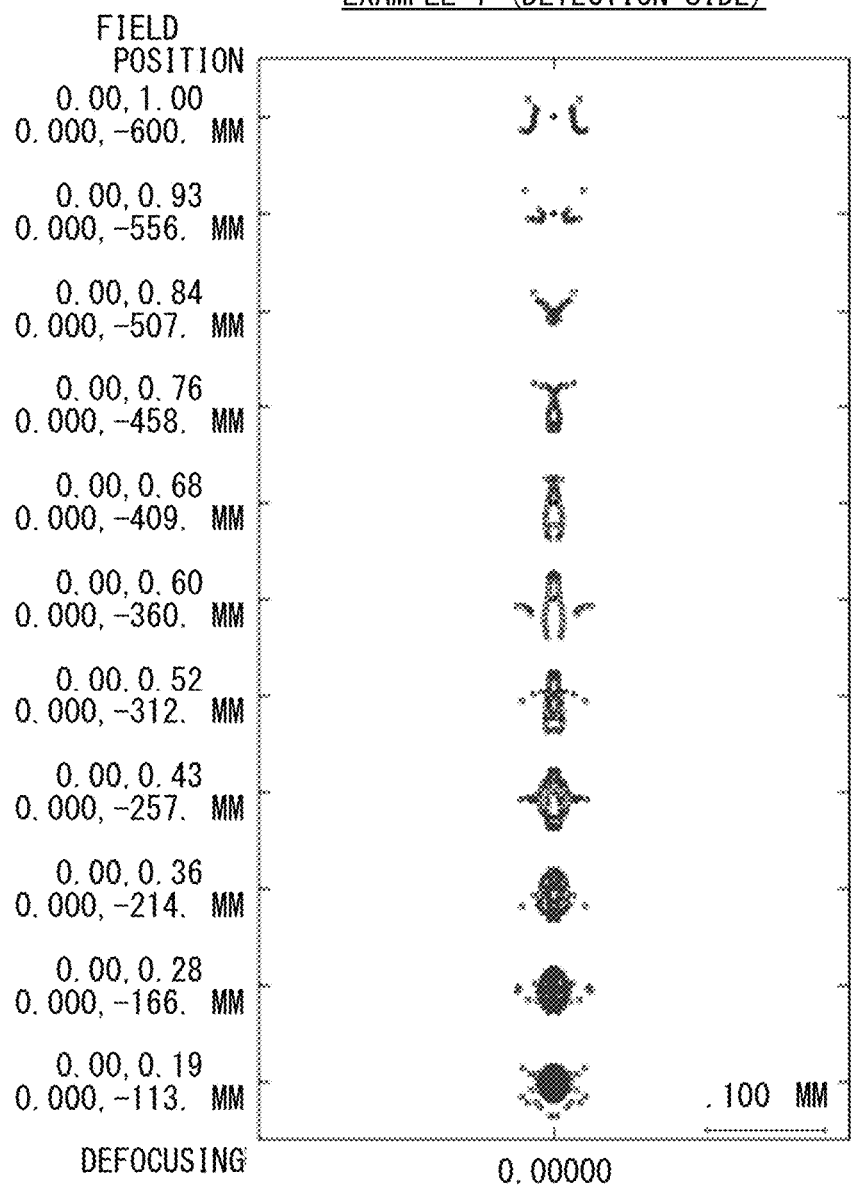

[FIG. 5]
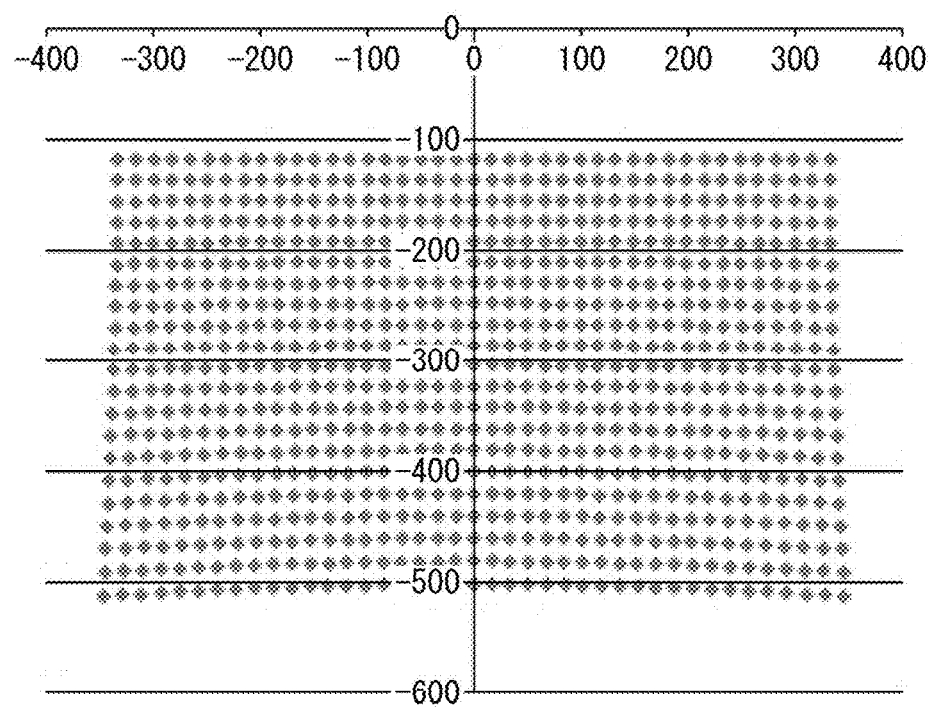

[FIG. 6]
EXAMPLE 2
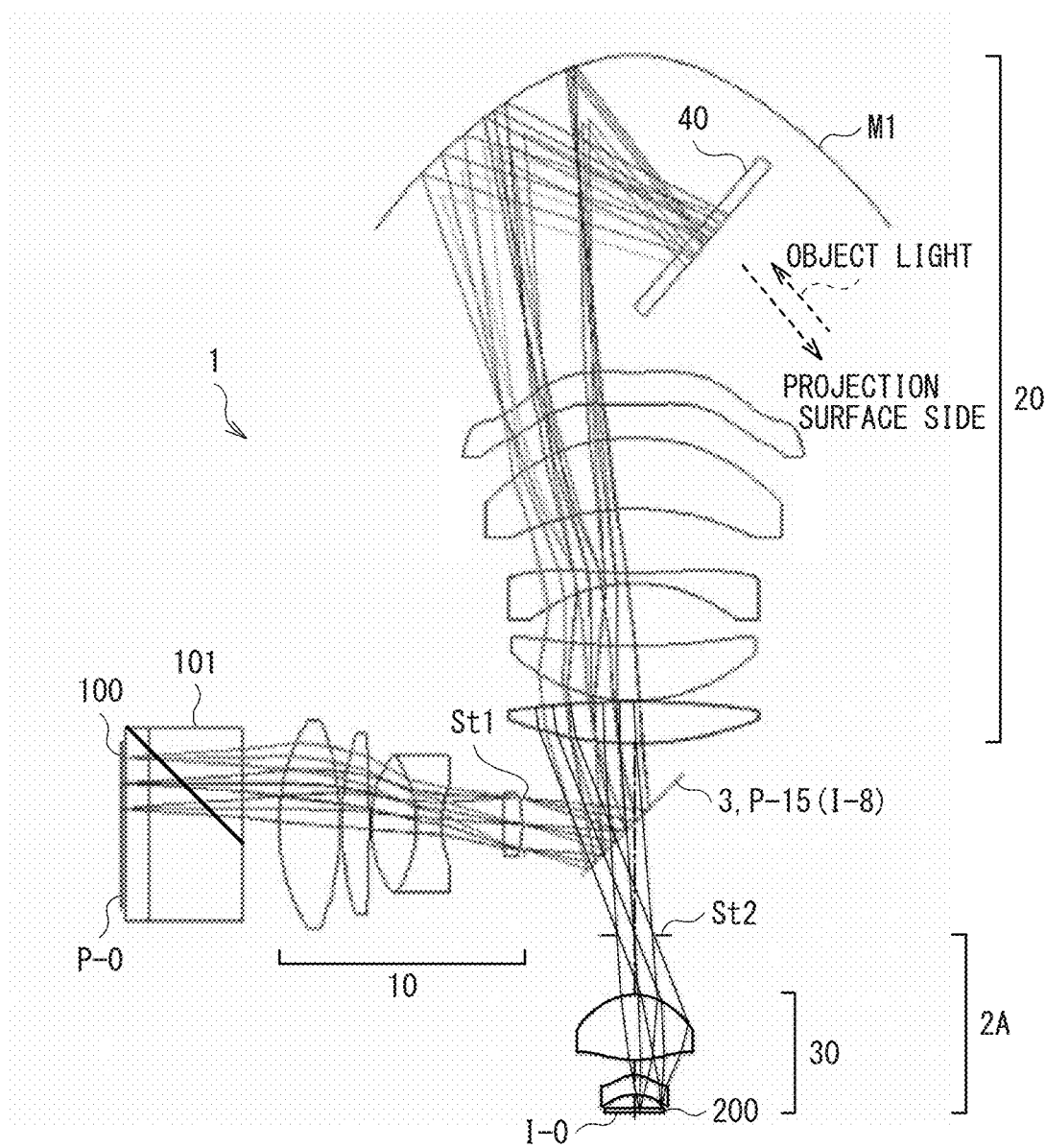

[FIG. 7]
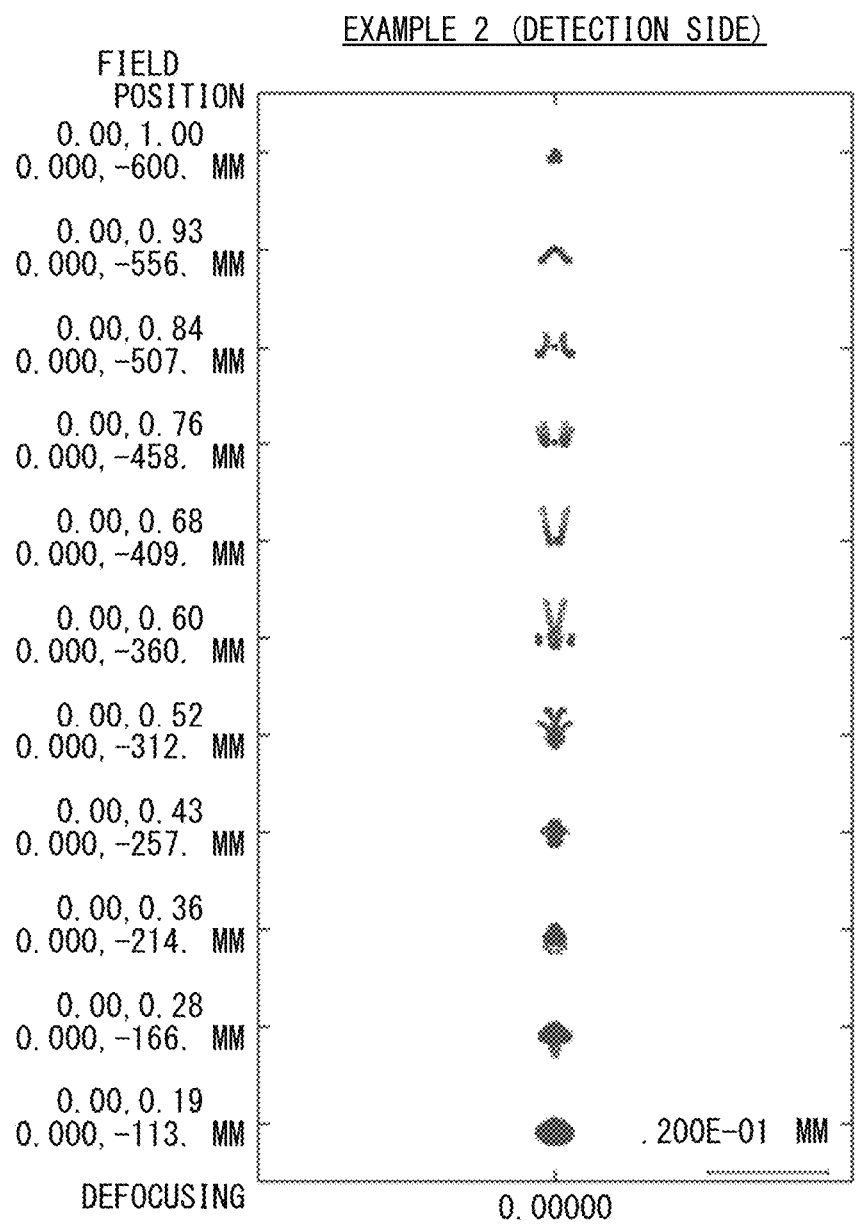

[FIG. 8]
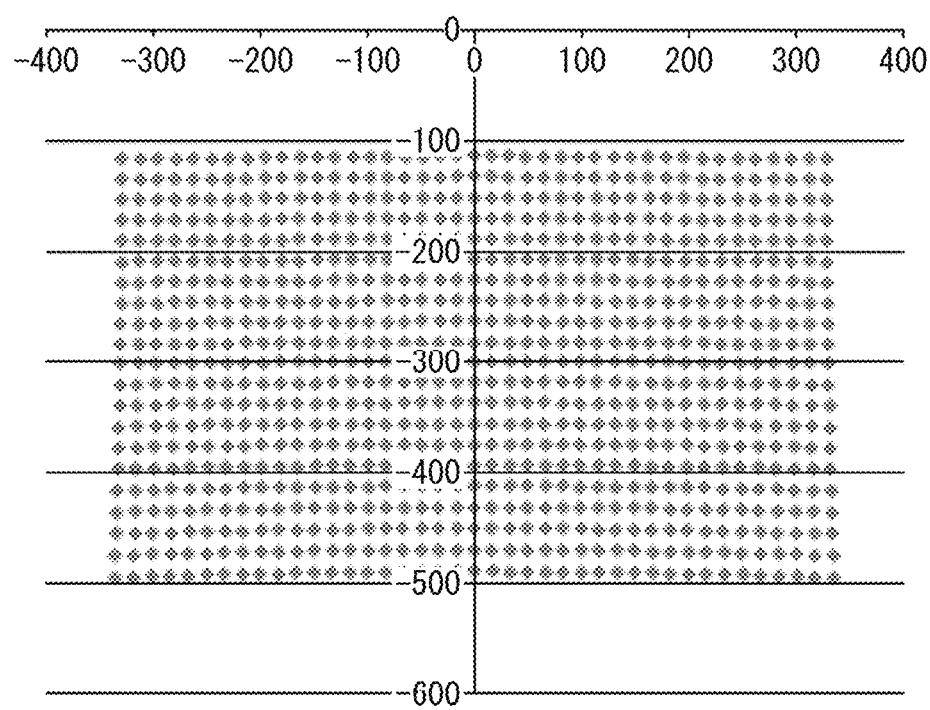

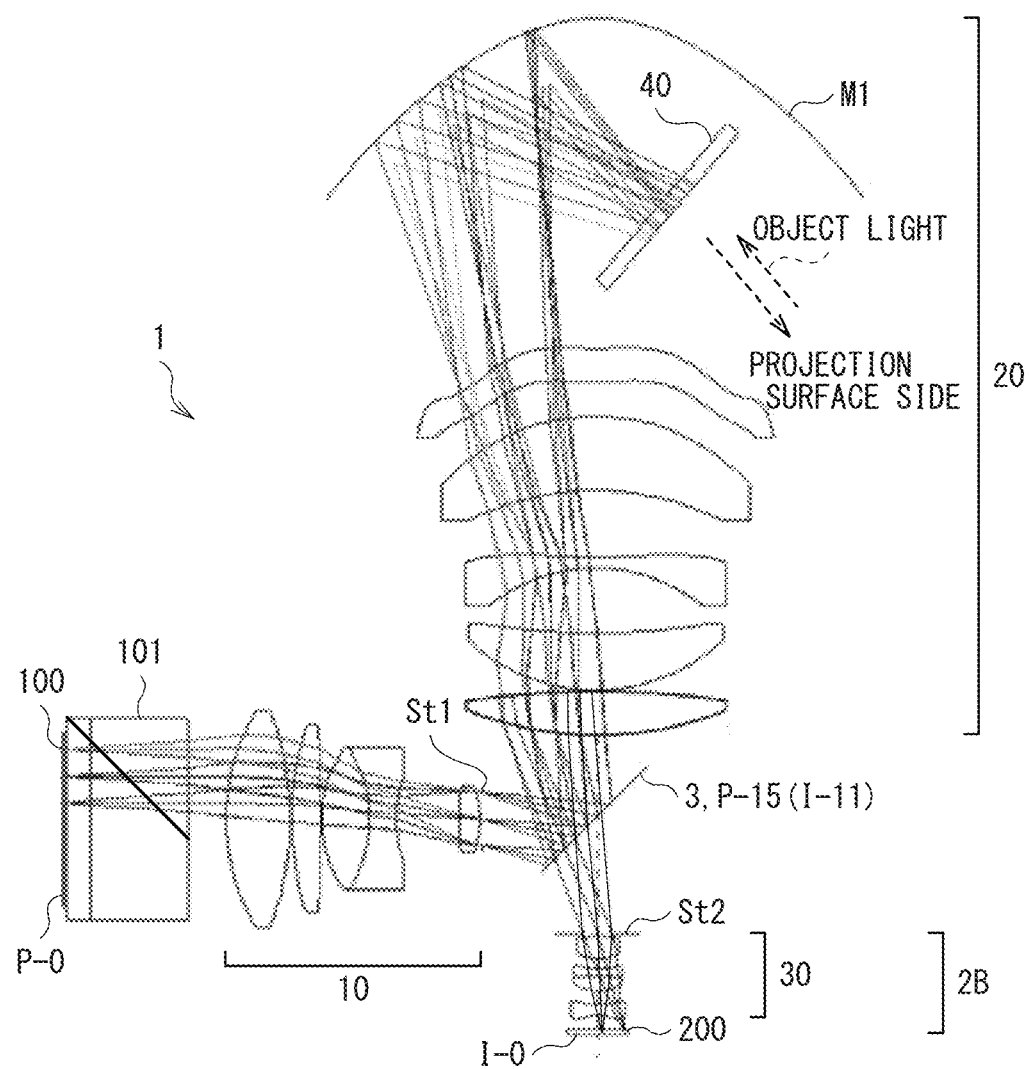

[FIG. 10]
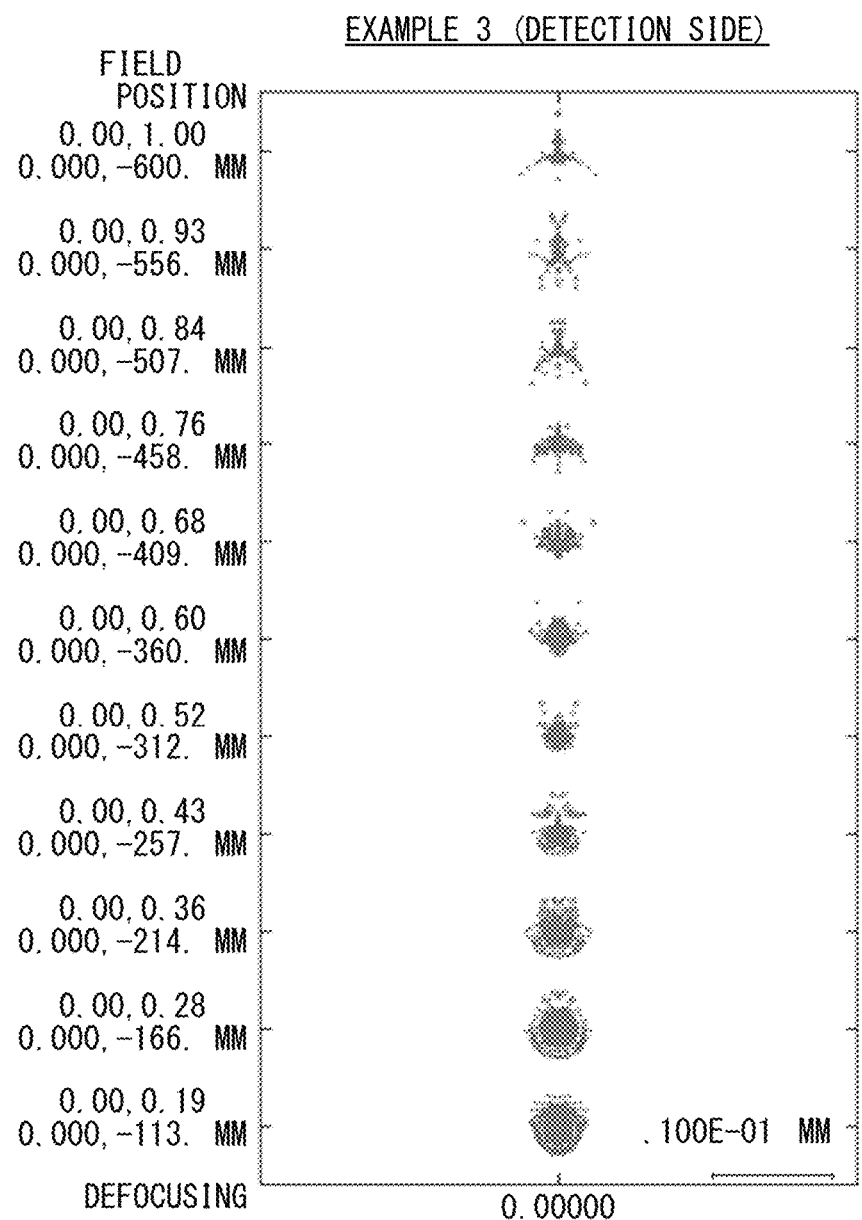

[FIG. 11]
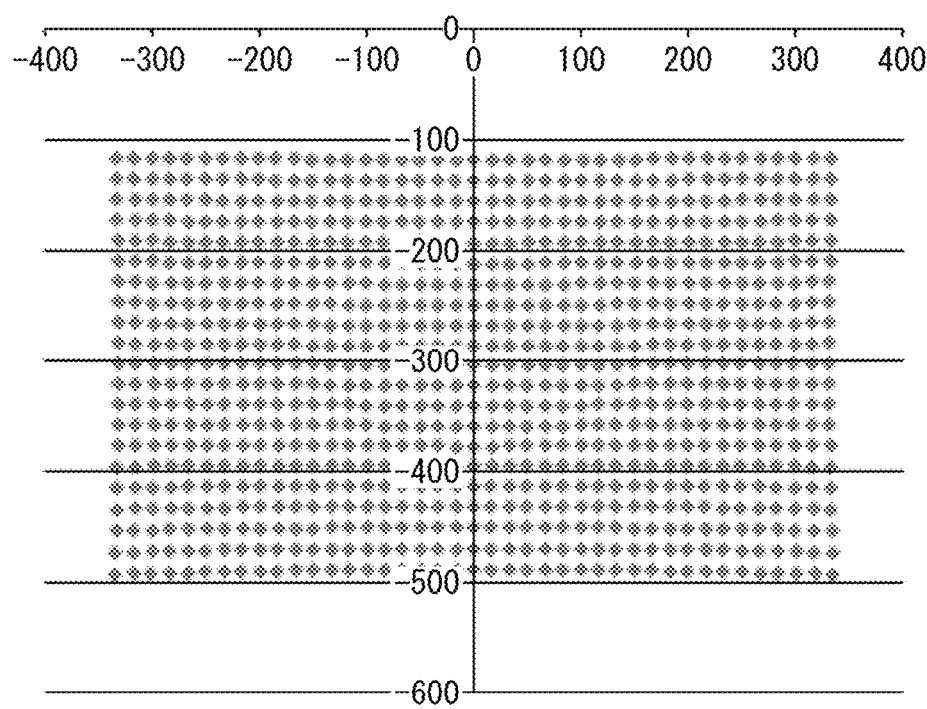

[FIG. 12]
MODIFICATION EXAMPLE 1
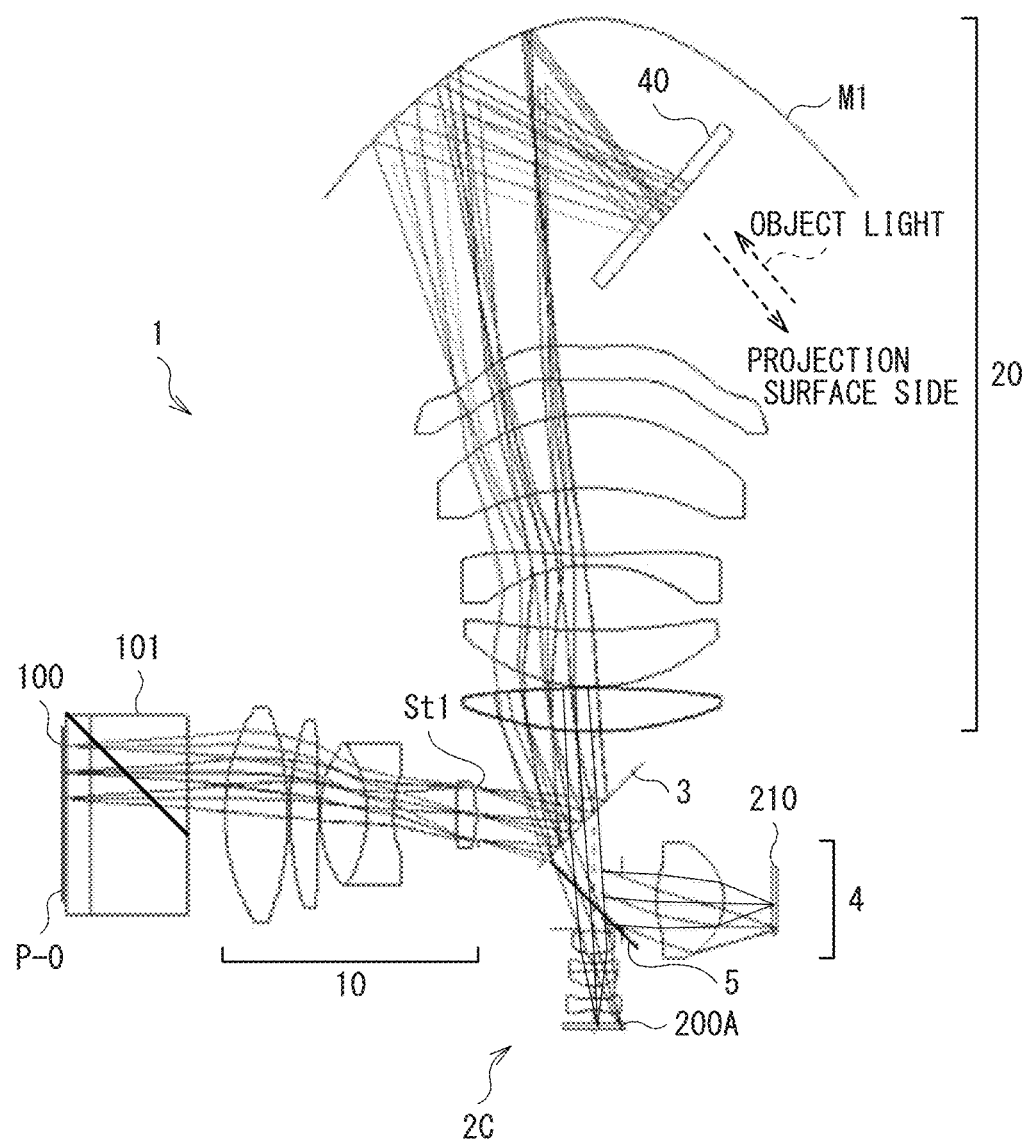

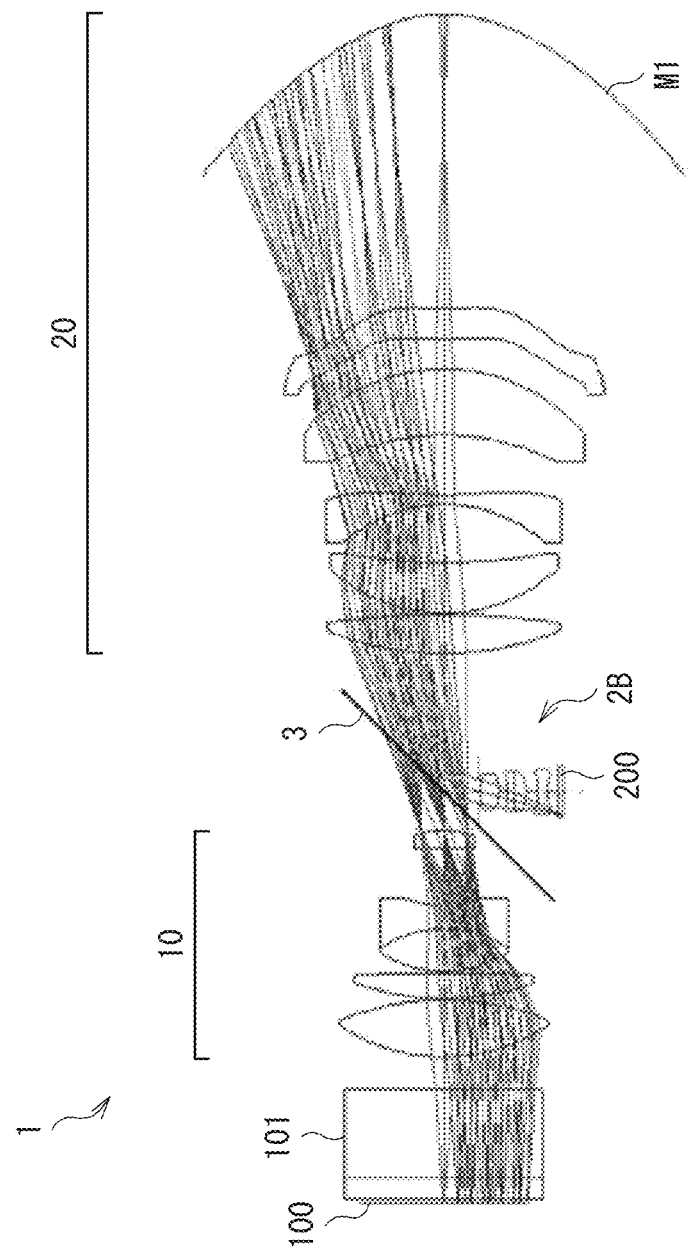
[FIG. 13]

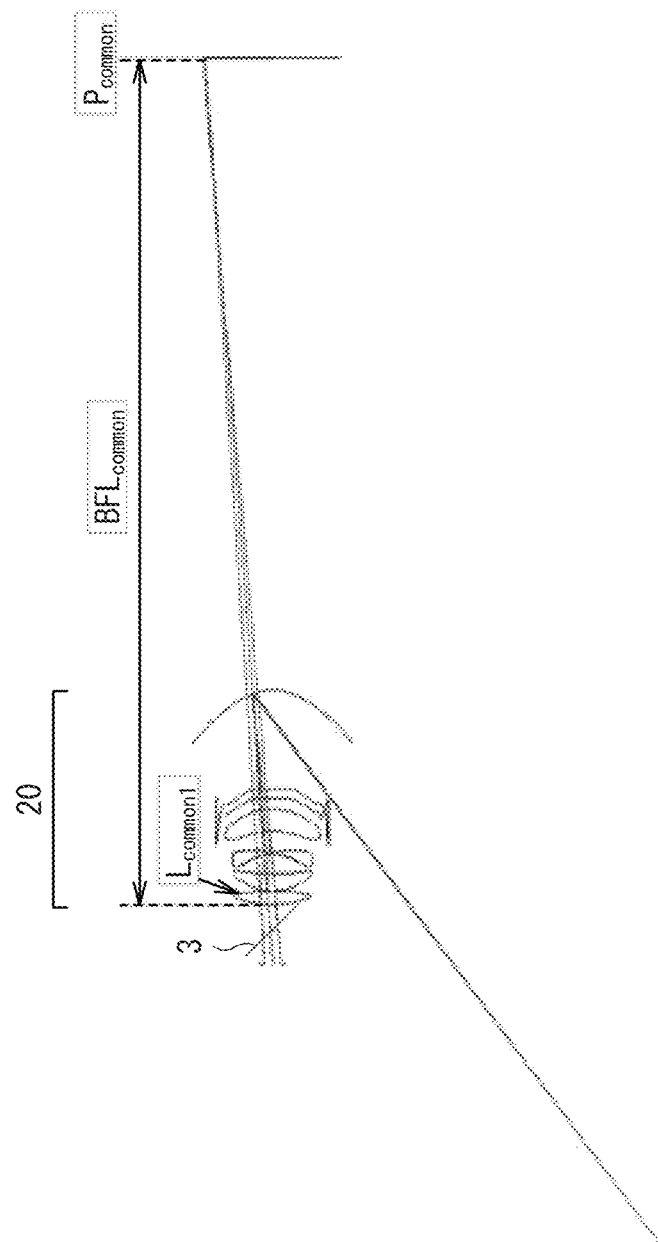
[FIG. 14]

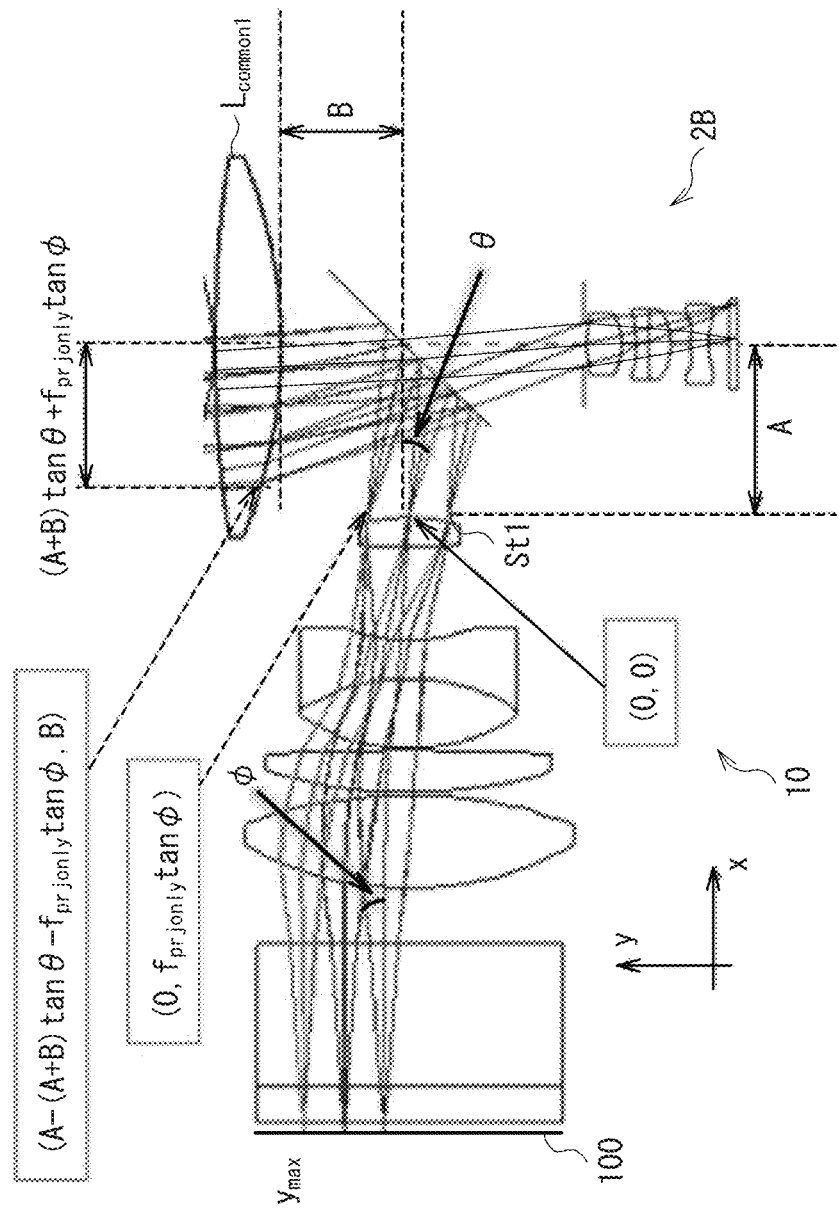
[FIG. 15]

OPTICAL SYSTEM AND PROJECTOR

CROSS REFERENCE TO RELATED APPLICATIONS

This application is a U.S. National Phase of International Patent Application No. PCT/JP2019/011124 filed on Mar. 18, 2019, which claims priority benefit of Japanese Patent Application No. JP 2018-074754 filed in the Japan Patent Office on Apr. 9, 2018. Each of the above-referenced applications is hereby incorporated herein by reference in its entirety.

TECHNICAL FIELD

The present disclosure relates to an optical system and a projector having an image projecting function and an object detecting function.

BACKGROUND ART

Recent smartphones, tablet terminals, or the like include a touch panel with which a user makes it possible to instinctively perform pointing operations, such as scrolling pages or zooming in or out an image displayed on the screen. Meanwhile, a display apparatus (projector) has long been known that performs image displaying by projecting an image on the screen. A system including such a projector provided with an imaging (detecting) function has been proposed (refer to PTLs 1 and 2, for example). The system of PTL 1 thus has a detecting function as a touch panel does.

CITATION LIST

Patent Literature

[PTL 1] Japanese Unexamined Patent Application Publication No. 2016-57426
[PTL 2] Japanese Unexamined Patent Application Publication No. 2016-220080

SUMMARY OF THE INVENTION

In a case of a projector provided with a detecting function, the detection optical system tends to have a complicated lens configuration. This may result in a large-sized configuration and high costs.

It is desirable to provide an optical system having a compact configuration and achieving high-performance object detection, and a projector including such an optical system.

An optical system according to one embodiment of the present disclosure includes a projection optical system, an optical path splitting unit, and a detection optical system. The projection optical system includes a plurality of lenses and projects, on a projection surface, an image generated by a light valve disposed on a first optical path. Object light entering from a detection object is incident on the projection optical system. The detection object is disposed on side of the projection surface, and the object light is incident from the side of the projection surface. The optical path splitting unit is disposed on the side of the projection surface relative to one of the plurality of lenses disposed most adjacent to the light valve in the projection optical system, and splits an optical path into the first optical path and a second optical path different from the first optical path. The detection optical system includes at least one lens disposed between an imaging device and the optical path splitting unit on the second optical path. The object light is incident through the optical path splitting unit on the detection optical system. The detection optical system forms an image of the detection object on an imaging surface of the imaging device.

A projector according to one embodiment of the present disclosure includes an optical system, a light valve, and an imaging device. The optical system is configured by the optical system according to one embodiment of the present disclosure.

According to the optical system or the projector according to one embodiment of the present disclosure, object light is incident on the detection optical system through the optical path splitting unit disposed in a projection optical system.

BRIEF DESCRIPTION OF THE DRAWINGS

FIG. 1 is an optical system cross-sectional view illustrating a configuration example of an optical system and a projector according to a comparative example.
FIG. 2 is an optical system cross-sectional view illustrating the configuration of an optical system according to Example 1.
FIG. 3 is an explanatory diagram illustrating an example relation between the position of an image display surface of a display element and the image height of an image incident on the projection optical system.
FIG. 4 is a spot diagram on the detection side of the optical system according to Example 1.
FIG. 5 is a diagram illustrating an image distortion on the detection side of the optical system according to Example 1.
FIG. 6 is an optical system cross-sectional view illustrating the configuration of an optical system according to Example 2.
FIG. 7 is a spot diagram on the detection side of the optical system according to Example 2.
FIG. 8 is a diagram illustrating an image distortion on the detection side of the optical system according to Example 2.
FIG. 9 is an optical system cross-sectional view illustrating the configuration of an optical system according to Example 3.
FIG. 10 is a spot diagram on the detection side of the optical system according to Example 3.
FIG. 11 is a diagram illustrating an image distortion on the detection side of the optical system according to Example 3.
FIG. 12 is an optical system cross-sectional view illustrating the configuration of an optical system according to Modification Example 1.
FIG. 13 is an optical system cross-sectional view illustrating the configuration of an optical system according to Modification Example 2.
FIG. 14 is an optical system cross-sectional view illustrating a main configuration of the projection optical system.
FIG. 15 is an optical system cross-sectional view illustrating a main configuration of the optical system.

MODES FOR CARRYING OUT THE INVENTION

Hereinafter, some embodiments of the present disclosure will be described in detail with reference to the drawings. It is to be noted that the description is given in the following order.

0. Comparative Example
1. Configuration Examples, Workings, and Effects of Optical System and Projector According to One Example
   1.1 Example 1
   1.2 Example 2
   1.3 Example 3
   1.4 Modification Example
   1.5 Effects
2. Other Embodiments

0. Comparative Example

Outline of Optical System and Projector According to Comparative Example

FIG. 1 illustrates a configuration example of an optical system and a projector according to a comparative example.

PTL 1 (Japanese Unexamined Patent Application Publication No. 2016-57426) discloses the configuration of a projector provided with a detection function as illustrated in FIG. 1.

The projector according to the comparative example includes a light valve 121, a polarizing beam splitter 123, a projection lens 124, and an illumination optical system 125.

The projector according to the comparative example also includes an imaging device 122 and a detection optical system 126 that serve as an imaging unit to detect the position of an object and perform imaging.

The light valve 121 is irradiated with illumination light L100 emitted from a non-illustrated illumination device through the illumination optical system 125 and the polarizing beam splitter 123. The light valve 121 is, for example, a liquid crystal element of a reflection type, such as a liquid crystal on silicon (LCOS) or the like. The light valve 121 generates image light by modulating the illumination light L100 on the basis of an image data. The image light generated by the light valve 121 is projected on a non-illustrated projection surface through the polarizing beam splitter 123 and the projection lens 124.

The projection lens 124 has a function as an imaging optical system for object detection as well as the image projection function. The image light (projection light L101) generated by the light valve 121 is incident on the projection lens 124, and scattering light (object light) from a detection object present near the projection surface is incorporated as detection light L102 from a projection surface side. The projection lens 124 is configured by an ultra-short focus lens, for example.

The imaging device 122 is configured by a solid-state imaging device, such as a complementary metal-oxide semiconductor (CMOS) or a charge coupled device (CCD). The imaging device 122 is disposed at an optically conjugate position to the projection surface. Further, the imaging device 122 is also disposed at an optically conjugate position to the light valve 121. More specifically, in a case where the light valve 121 is a liquid crystal element of a reflection type, a display surface (liquid crystal surface) that generates an image and an imaging surface of the imaging device 122 are disposed at respective positions optically conjugate to each other. Scattering light (object light) from the detection object is incident as detection light L102 on the imaging device 122 through the projection lens 124 and the polarizing beam splitter 123. The imaging device 122 is configured to perform imaging of at least an imaging area that is substantially identical to a projection area on the projection surface.

The projection lens 124 (ultra-short focus lens, in specific) serves also as an imaging lens in the detection system in the projector according to the comparative example. This makes it possible to acquire a detection image with less image distortion. Accordingly, the projection lens 124 allows for object detection with higher accuracy than a fish-eye lens, a wide-angle lens, or the like disposed outside does. Additionally, the need for performing a particular geometric correction or the like is eliminated, which brings out the merit of higher processing speed, and also leads to a reduction in cost and size.

(Problems)

In the projector according to the comparative example described above, the polarizing beam splitter 123 disposed on a part corresponding to the back focus of the projection lens 124 performs splitting into the detection light L102 and the projection light L101. The polarizing beam splitter 123 also performs splitting into the projection light L101 and the illumination light L100 at the same location. The technique, however, has the following problems.

(1) The lens configuration of the detection optical system 126 tends to be complicated, which leads to an increase in size and cost of the detection optical system 126.

In the detection optical system 126, an image once formed into a size nearly the same as the size of the light valve is condensed again to form another image. Thus, the power of the lens in the detection optical system 126 tends to be large. Moreover, to meet the demand for reducing the size of the detection optical system 126 itself, a further increase in the relay power is required, which may increase an aberration amount. Further, there are some attempts to further reduce the size and cost of the detection optical system 126 by reducing the size of the imaging device 122 in comparison with the light valve 121. However, in this case, it has been difficult to obtain detection resolution nearly equivalent to the resolution of the light valve 121 particularly due to the tendency of large aberration deterioration. Further, in the case of detection of visible light and infrared light as the detection light L102, the lens configuration of the detection optical system 126 undergoes a very large load.

(2) A leak from the illumination light L100 is large, which deteriorates an S/N ratio. In the configuration of the projector according to the comparative example, the splitting unit (the polarizing beam splitter 123) performs not only splitting into the detection light L102 and the projection light L101 but also splitting into the projection light L101 and the illumination light L100. This causes a slight leakage of the illumination light L100 into the detection optical system 126. The rate of the leakage is very slight, 1% or less. However, the leakage of the illumination light L100 as an illuminant inherently causes the detection light L102 to be large background light. Although the conventional technique is also designed to reduce noises relevant to the detection light L102 by inserting a bandpass filter or the like, the conventional technique faces its own limit. Moreover, it is desired that the number of such optical elements be reduced as much as possible to lower the cost. Further, the bandpass filter requires shielding of a visible light band, which inevitably produces the demerit of difficulty in acquiring visible light by the detection system.

(3) As a measure to address the above-mentioned problem (2), a technique may be provided that extends the back focus of the projection lens 124 and adds another splitting unit to the back focus portion. The splitting into the illumination light L100 and the projection light L101 is thereby completely separated from the splitting into the projection light L101 and the detection light L102. However, this technique is inappropriate in consideration of the size. For example, PTL 2 (Japanese Unexamined Patent Application Publication No. 2016-220080) is a representative example of such a technique. In this technique, the entire length of a lens barrel of the projection lens 124 is increased in proportion to a large increase in the back focus. Specifically, in the case of the projection lens 124, which may an ultra-short focus lens, originally having a long entire length and a large volume, an increase in the entire length of the back focus should be avoided because it results in a large increase in the entire volume and entire length of the projector.

It is therefore desired to develop an optical system and a projector having a compact configuration and achieving high-performance object detection.

Hereinafter, as one embodiment of the present disclosure, a technology is described in which the splitting into an optical path of the projection system and an optical path of the detection system is performed near a focal point of the projection lens rather than on the back focus portion of the projection lens. This technology allows for simplification, downsizing, and lower costs of the lens configuration in the detection system.

1. Configuration Examples, Workings, and Effects of Optical System and Projector According to One Embodiment

Outline of Optical System and Projector According to One Embodiment

FIG. 2 illustrates an optical system and a projector having a configuration of a first example (Example 1) according to one embodiment of the present disclosure. FIG. 6 illustrates an optical system and a projector having a configuration of a second example (Example 2). FIG. 9 illustrates an optical system and a projector having a configuration of a third example (Example 3). Numerical examples (Examples 1 to 3) that corresponds to these configuration examples to which specific numerical values are applied are described below.

Hereinafter, the configurations of an optical system and a projector according to one embodiment of the present disclosure are described mainly with reference to the optical system and the projector having the configuration of the first example illustrated in FIG. 2; however, the technology of the present disclosure is not limited to the illustrated configuration example.

The projector according to one embodiment of the present disclosure includes an optical system, a display element (light valve 100), and a detection element (imaging device 200). The optical system includes a projection optical system 1, a detection optical system 2, an optical path splitting unit 3, and an illumination optical system 300.

The imaging device 200 is configured by a solid-state imaging device, such as a CMOS, a CCD, or the like, for example.

The light valve 100 is a liquid crystal panel of a reflection type, such as an LCOS, for example. Alternatively, a transmissive liquid crystal panel or a digital mirror device (DMD) may be used as the light valve 100.

The illumination optical system 300 includes a polarizing separation element 101. The illumination optical system 300 emits illumination light to the light valve 100 through the polarizing separation element 101.

The projection optical system 1 includes a plurality of lenses. A portion of the projection optical system 1 on the side of the light valve 100 relative to the optical path splitting unit 3 corresponds to a projection-dedicated optical system 10. The other portion of the projection optical system 1 on the side of the projection surface relative to the optical path splitting unit 3 corresponds to a common optical system 20.

The projection optical system 1 has a function of projecting, on the projection surface, an image generated by the light valve 100 disposed on a first optical path. Additionally, object light from a detection object present on the projection surface side is incident on the projection optical system 1 from the projection surface side. The common optical system 20 of the projection optical system 1 constitutes a portion of an imaging optical system for object detection.

It is desirable that the projection optical system 1 have a projection-side diaphragm St1 on the side of the light valve 100 relative to the optical path splitting unit 3.

The optical path splitting unit 3 is disposed on the side of the projection surface relative to the lens disposed most adjacent to the light valve 100 out of the plurality of lenses of the projection optical system 1. The optical path splitting unit 3 splits the optical paths of the projection optical system 1 and the detection optical system 2 into a first optical path and a second optical path different from the first optical path.

It is desirable that the optical path splitting unit 3 be disposed at a position on the optical path of the projection optical system 1 and not crossing an optical path of the illumination optical system 300.

It is desirable that the optical path splitting unit 3 be disposed between any two lenses out of the plurality of lenses of the projection optical system 1.

The optical path splitting unit 3 is a polarizing beam splitter, for example. The optical path splitting unit 3 is a polarizing beam splitter having a polarizing separation function with respect to visible light and infrared light, for example.

The detection optical system 2 forms an image of the detection object as object light using infrared light or visible light. The optical system may include an infrared light source that emits infrared light for object detection and an optical system that emits infrared light for object detection to the projection surface.

The detection optical system 2 includes a lens unit 30 disposed between the imaging device 200 and the optical path splitting unit 3 on the second optical path. The lens unit 30 of the detection optical system 2 includes at least one lens. The object light is incident on the detection optical system 2 through the optical path splitting unit 3. The detection optical system 2 forms an image of the detection object on an imaging surface of the imaging device 200.

It is desirable that the at least one lens of the lens unit 30 of the detection optical system 2 include at least one aspherical lens.

The lens unit 30 of the detection optical system 2 may include two or more lenses, as in detection optical systems 2A and 2B having respective example configuration illustrated in FIGS. 6 and 9. It is desirable that at least the lens disposed most adjacent to the imaging device 200 out of the two or more lenses of the lens unit 30 in the detection optical system 2A or 2B be an aspherical lens. Further, it is desirable that the lens disposed most adjacent to the optical path splitting unit 3 out of the two or more lenses of the lens unit 30 in the detection optical system 2A or 2B have a positive power.

It is desirable that the detection optical system 2 have a detection-side diaphragm St2 on the side of the imaging device 200 relative to the optical path splitting unit 3.

It is desirable that a point of intersection of an optical axis and a principal ray exist between the imaging device 200 and the optical path splitting unit 3 in the detection optical system 2. This means that a position corresponding to the detection-side diaphragm St2 exists between the imaging device 200 and the optical path splitting unit 3.

In the optical system of the present disclosure, it is desirable that the distance from the projection-side diaphragm St1 to the optical path splitting unit 3 on the optical axis be identical to the distance from the detection-side diaphragm St2 to the optical path splitting unit 3 on the optical axis.

In the optical system of the present disclosure, it is desirable that $$PL/PH \leq 0.42$$

is satisfied, where PL denotes the distance of projection by the projection optical system 1, and PH denotes the horizontal size of a projection image on the projection surface. PL/PH is the throw ratio of the projector. It is desirable that the throw ratio of the projector of the present disclosure be 0.42 or less, and that the projection optical system 1 be an ultra-short focus lens.

EXAMPLES

Configuration examples, workings, and effects of the optical system and the projector according to one embodiment of the present disclosure will now be described with reference to specific numerical examples.

The meanings and the like of the symbols shown in tables or the like of each example and each comparative example described below are as follows. "P-i" or "I-i" represent the number of i-th surface, and the value of "i" sequentially increases as the surface is more adjacent to the projection surface. Note that the surface P-0 corresponds to a display surface of the light valve 100. The surface I-0 corresponds to the imaging surface of the imaging device 200.

"Ri" represents the paraxial radius of curvature (mm) of the i-th surface. "Di" represents the interval between the i-th surface and the i+1th surface on the optical axis (mm). "Ndi" represents the reflective index value the d-line (wavelength: 587.6 nm) of the material (medium) of an optical element having the i-th surface. "vdi" represents the Abbe number value of the d-line of the material of the optical element having the i-th surface. "Ri" taking a value of "∞" represents a flat surface or a diaphragm surface. "Type" represents the type of shape of lens surface.

The optical system according to each example and each comparative example includes an aspherical surface. The shape of the aspherical surface is defined by the following expression for an aspherical surface. Noted that, in each of the following tables indicating aspherical coefficients, "E-n" represents an exponential notation the base of which is 10. That is, "E-n" represents "$10^{-n}$". For example, "0.12345E-05" represents "$0.12345 \times 10^{-5}$".

[Expression 1]

$$Z = \frac{cr^2}{1 + \sqrt{1 - (1+k)c^2 r^2}} + A1r^1 + A2r^2 + A3r^3 + A4r^4 + \ldots \quad (1)$$

In the above-described expression for an aspherical surface, "Z" denotes the depth (sagging quality) of the aspherical surface. "r" denotes the distance from the center axis of a portion where the sagging quantity is to be calculated (a height from the optical axis). "c" denotes the paraxial radius of curvature of a surface. "k" represents a conic coefficient. "Ai" represents an i-th aspherical surface coefficient.

1.1 Example 1

[Table 1] to [Table 4] show lens data of the optical system according to Example 1 having an example configuration illustrated in FIG. 2 to which specific numerical values are applied. [Table 1] and [Table 2] show lens data of the projection optical system 1 in the optical system according to Example 1. [Table 2] shows data of the aspherical surface in the projection optical system 1. [Table 3] and [Table 4] show lens data of the detection optical system 2 in the optical system according to Example 1. [Table 4] indicates data of the aspherical surface in the detection optical system 2. In [Table 1] and [Table 2], "P-i" represents a surface number in the projection optical system 1. In [Table 3] and [Table 4], "I-i" represents a surface number in the projection optical system 1.

As described above, the common optical system 20 in the projection optical system 1 also serves as the detection-side imaging optical system. In the optical system according to Example 1, the surface P-15 of the projection optical system 1 is identical to the surface I-6 of the detection optical system 2, as shown in [Table 3]. A surface following the surface I-6 of the detection optical system 2 is on the optical path of the common optical system 20 in the projection optical system 1.

In the optical system according to Example 1, the lens unit 30 of the detection optical system 2 is configured by a single aspherical lens.

TABLE 1

Examples 1 to 3 (Projection optical system)

| P-i | Type | Ri | Di | Ndi | vdi | Element |
|---|---|---|---|---|---|---|
| P-0 | spherical | ∞ | 0.00 | | | light valve |
| P-1 | spherical | ∞ | 0.50 | | | |
| P-2 | spherical | ∞ | 2.10 | 1.4585 | 67.80 | cover glass |
| P-3 | spherical | ∞ | 8.60 | 1.8052 | 25.46 | prism (polarization separation element) |
| P-4 | spherical | ∞ | 3.30 | | | |
| P-5 | spherical | 18.509 | 5.60 | 1.4970 | 81.61 | |
| P-6 | spherical | −27.380 | 0.15 | | | |
| P-7 | spherical | 26.669 | 2.50 | 1.8061 | 33.27 | |
| P-8 | spherical | −165.454 | 0.15 | | | |
| P-9 | spherical | 10.966 | 4.20 | 1.4875 | 70.44 | |
| P-10 | spherical | −11.414 | 2.31 | 2.0010 | 29.13 | |
| P-11 | spherical | 10.514 | 5.59 | | | |
| P-12 | spherical | 167.938 | 1.76 | 1.5673 | 42.84 | |
| P-13 | spherical | −9.619 | 0.15 | | | |
| P-14 | spherical | ∞ | 10.00 | | | projection-side diaphragm (St 1) |
| P-15 | spherical | ∞ | −7.38 | | | optical path splitting unit |
| P-16 | spherical | −30.587 | −3.80 | 1.4875 | 70.44 | |
| P-17 | spherical | 83.024 | −0.15 | | | |
| P-18 | spherical | −16.461 | −5.00 | 1.5168 | 64.20 | |
| P-19 | spherical | −60.317 | −5.72 | | | |
| P-20 | aspherical | 14.868 | −0.90 | 1.8344 | 37.29 | |
| P-21 | aspherical | −32.658 | −5.92 | | | |
| P-22 | spherical | 24.603 | −6.50 | 1.5688 | 56.04 | |
| P-23 | spherical | 18.109 | −2.97 | | | |
| P-24 | aspherical | 18.228 | −3.00 | 1.5094 | 56.42 | |
| P-25 | aspherical | 63.301 | −29.00 | | | |
| P-26 | aspherical | 25.890 | 162.46 | | | concave mirror (M1) |
| P-27 | spherical | ∞ | 0.00 | | | projection image (detection object) |

TABLE 2

Examples 1 to 3 (Projection optical system)

| | P-i | | | | |
|---|---|---|---|---|---|
| | P-20 | P-21 | P-24 | P-25 | P-26 |
| k | −0.846 | −79.933 | 0.610 | −13.621 | −2.289 |
| A1 | | | | | −5.244E−03 |
| A2 | | | −5.599E−02 | −3.305E−02 | 1.543E−02 |

TABLE 2-continued

Examples 1 to 3 (Projection optical system)

P-i

| | P-20 | P-21 | P-24 | P-25 | P-26 |
|---|---|---|---|---|---|
| A3 | | | 4.689E−03 | 5.388E−03 | 1.471E−04 |
| A4 | 1.146E−04 | 1.200E−04 | 1.727E−04 | 5.719E−05 | −3.658E−05 |
| A5 | | | −3.853E−06 | −2.313E−06 | |
| A6 | −1.545E−06 | −5.770E−07 | −6.815E−07 | −2.273E−07 | 1.050E−07 |
| A7 | | | −4.738E−08 | −1.193E−08 | |
| A8 | 6.640E−09 | 1.361E−09 | −2.226E−09 | −8.655E−10 | −2.281E−10 |
| A9 | | | −5.628E−11 | −8.101E−11 | |
| A10 | 1.172E−11 | −2.133E−12 | 2.775E−12 | −6.877E−12 | 3.974E−13 |
| A11 | | | | | |
| A12 | | 1.464E−13 | 4.552E−14 | −2.059E−14 | −4.501E−16 |
| A13 | | | | | |
| A14 | | −6.359E−16 | 1.410E−16 | 8.590E−17 | 2.141E−19 |
| A15 | | | | | |
| A16 | | | −8.703E−20 | 9.809E−19 | 1.296E−22 |
| A17 | | | | | |
| A18 | | | −1.269E−21 | −1.798E−22 | −1.544E−25 |
| A19 | | | | | |
| A20 | | | | | |

TABLE 3

Example 1 (Detection optical system)

| I-i | Type | Ri | Di | Ndi | vdi | Element |
|---|---|---|---|---|---|---|
| I-0 | spherical | ∞ | 0.00 | | | imaging device |
| I-1 | spherical | ∞ | 0.45 | 1.5168 | 64.20 | cover glass |
| I-2 | spherical | ∞ | 4.18 | | | |
| I-3 | aspherical | 4.089 | 6.00 | 1.5094 | 56.42 | |
| I-4 | aspherical | −6.848 | 3.04 | | | |
| I-5 | spherical | ∞ | 10.00 | | | detection-side diaphragm (St2) |
| I-6/P-15 | spherical | ∞ | 7.38 | | | optical path splitting unit |
| I-7/P-16 | spherical | 30.587 | 3.80 | 1.4875 | 70.44 | common optical system (following is omitted) |

TABLE 4

Example 1 (Detection optical system)

I-i

| | I-3 | I-4 |
|---|---|---|
| k | −2.184 | −3.919 |
| A1 | | |
| A2 | | |
| A3 | | |
| A4 | 4.356E−04 | 3.983E−04 |
| A5 | | |
| A6 | 1.656E−05 | −2.517E−05 |
| A7 | | |
| A8 | 1.716E−06 | 6.295E−06 |
| A9 | | |
| A10 | −2.421E−08 | |

In the optical system according to Example 1, the light valve 100 has a panel size (panel diagonal size) of 0.37 inches (8.2 mm×4.61 mm). The imaging size on the detection side corresponds to 1/6 type (2.6 mm×1.5 mm). That is, the detection side is 0.32 times smaller than the projection side.

FIG. 3 illustrates a relation between the position of the image display surface of the light valve 100 and the image height of an image incident on the projection optical system 1. A maximum image height from the optical axis of an image to be projected on the light valve 100 is represented by "hmax". A minimum image height from the optical axis of an image incident on the projection optical system 1 is represented by "hmin". "h0" represents 0% of the maximum image height (zero image height) and corresponds to the optical axis of the projection optical system 1.

The V shift amount of the light valve 100 is −3.74 mm (−81.1%), and the effective image circle is φ14.8. The V shift amount (%) is also applied to the imaging device 200.

The F number of the projection optical system 1 is 4, and the F number of the detection side is 1.33. Further, the projection side and the detection side are both arranged telecentrically. Furthermore, the projection optical system 1 is designed to have a resolution of FHD (1920×1080). This design allows for detection of infrared light of 785 nm, and the resolution on the imaging device 200 is 0.05 mm. This corresponds to a resolution to a detection object having about a finger size in the case of projection on the projection surface of a 25-inch panel. The design is made so that the touch of a finger is allowed to be determined.

FIG. 4 illustrates a spot diagram on the detection side of the optical system according to Example 1. The diagram indicates that it is possible to achieve a root mean square (RMS) resolution of 0.05 mm at any image height.

FIG. 5 illustrates an image distortion on the detection side of the optical system according to Example 1. FIG. 5 illustrates the image distortion on the imaging device 200 as a result of calculation in the projection direction (back calculation). As illustrated in FIG. 5, a slight distortion is observed, but the degree of the distortion is within a level that is sufficiently processable through a signal process on the detection side.

In the optical system according to Example 1, only a resolution of about a finger size may be obtained on the detection side. However, the detection optical system 2 may be configured by a single plastic aspherical lens, and the optical system according to Example 1 is thus characterized by being very compact and inexpensive. If the branching configuration between the projection system and the detection system is configured as in the comparative example (FIG. 1), two lenses are needed and the entire length of the detection side should be set to 40 mm, in order to obtain the performance equivalent to the detection system of Example 1. In contrast, in the optical system according to Example 1, the entire length of the detection side from the optical path splitting unit 3 is only 22.7 mm.

In the optical system according to Example 1, the configuration example in which the projection optical system 1 is an ultra-short focus lens is described; however, it is certainly possible to configure the projection optical system 1 by a general long focus lens, and the detection optical system 2 by a single lens. In the case of the long focus lens, however, it is difficult to take advantage of the merit of configuring the detection optical system 2 by a single lens because substantially no side effect is given in terms of downsizing of the system even though a camera is disposed outside the projector. In the case of the ultra-short focus lens, wide-angle imaging with an outside camera often causes problems of image distortion. In this respect, the configuration of the detection optical system 2 in Example 1 is more compatible with an ultra-short focus lens (a throw ratio of 0.42 or less in accordance with the Law on Promoting Green Purchasing).

Further, in Example 1, the optical path splitting unit 3 is positioned behind the projection-side diaphragm St1 when viewed from the projection side. Additionally, the optical path splitting unit 3 is disposed adjacent, in some degree, to the position of the projection-side diaphragm St1. This makes it possible to simplify the design. Further, in order to achieve downsizing, it is preferable that $$0 < f_{Imgonly} < f_{Prjonly} \qquad (2)$$

be satisfied so that the imaging device 200 on the detection side is smaller than the light valve 100 on the projection side. Here, $f_{Imgonly}$ denotes the focal length of only an optical path portion on the detection side, and $f_{Prjonly}$ denotes the focal length of a dedicated optical path portion on the projection side. That is, $f_{Imgonly}$ denotes the focal length of the detection optical system 2 (the focal length of the lens unit 30) between the optical path splitting unit 3 and the imaging device 200 in the detection optical system 2. Further, $f_{Prjonly}$ denotes the focal length of the lens (the projection-dedicated optical system 10) disposed on the optical path between the optical path splitting unit 3 and the light valve 100 in the projection optical system 1. In Example 1, $f_{Imgonly}$ corresponds to the focal length of the surfaces I-0 to I-5, and $f_{Prjonly}$ corresponds to the surfaces P-0 to P-14.

[Table 5] shows values relevant to the conditional expression (2) directed to the optical system according to each of the examples (Examples 1 to 3). [Table 5] demonstrates that the optical system according to Example 1 satisfies the expression (2). Note that [Table 5] also shows values relevant to another condition described below directed to each of the examples (Examples 1 to 3). The optical system according to Example 1 satisfies all conditions described below as well as the expression (2).

TABLE 5

| Example | $f_{Prjonly}$ [mm] | $f_{Imgonly}$ [mm] | A [mm] | B [mm] | Fno. | $y_{max}$ [mm] | L [mm] |
|---|---|---|---|---|---|---|---|
| 1 | 18.7 | 6.23 | 10 | 7.38 | 4 | 7.4 | 5.1 |
| 2 | 18.7 | 6.48 | | | | | |
| 3 | 18.7 | 5.95 | | | | | |

| Example | $f_{Imgl}$ | $f_{Imgl}/f_{Imgonly}$ | $BFL_{common}$ [mm] |
|---|---|---|---|
| 1 | 6.23 | 100% | 249 |
| 2 | 8.16 | 126% | |
| 3 | 6.23 | 105% | |

Additionally, on the detection side in the optical system according to Example 1, a part corresponding to the detection-side diaphragm St2 for the detection side presents on the optical path between the imaging device 200 and the optical path splitting unit 3, and a point of intersection of the optical axis and a principal ray of each image height exists. If there is no part corresponding to the detection-side diaphragm St2, the degree of freedom to reduce spherical aberration decreases, making it difficult to find a design solution to the design requiring a particularly high resolution.

Further, in the optical system according to Example 1, the distance from the surface P-14 to the surface P-15 is identical to the distance from the surface I-5 to the surface I-6, and the distance from the projection-side diaphragm St1 to the optical path splitting unit 3 is equal to the distance from the detection-side diaphragm St2 to the optical path splitting unit 3.

1.2 Example 2

[Table 6] and [Table 7] show lens data of the detection optical system 2A in an optical system according to Example 2 having an example configuration illustrated in FIG. 6 to which specific numerical values are applied. [Table 7] shows data of the aspherical surface of the detection optical system 2A.

TABLE 6

| | | | Example 2 (Detection optical system) | | | |
|---|---|---|---|---|---|---|
| I-i | Type | Ri | Di | Ndi | vdi | Element |
| I-0 | spherical | ∞ | 0.00 | | | imaging device |
| I-1 | spherical | ∞ | 0.45 | 1.5168 | 64.20 | cover glass |
| I-2 | spherical | ∞ | 1.20 | | | |
| I-3 | aspherical | −3.157 | 1.70 | 1.5094 | 56.42 | |
| I-4 | aspherical | −3.250 | 1.52 | | | |
| I-5 | aspherical | 13.540 | 6.00 | 1.5163 | 64.07 | |
| I-6 | aspherical | −5.123 | 5.89 | | | |
| I-7 | spherical | ∞ | 10.00 | | | detection-side diaphragm (St2) |
| I-8/P-15 | spherical | ∞ | 7.38 | | | optical path splitting unit |
| I-9/P-16 | spherical | 30.587 | 3.80 | 1.4875 | 70.44 | common optical system (following is omitted) |

TABLE 7

| | Example 2 (Detection optical system) | | | |
|---|---|---|---|---|
| | | I-i | | |
| | I-3 | I-4 | I-5 | I-6 |
| k | 0 | 0 | 0 | −0.484 |
| A1 | | | | |
| A2 | | | | |
| A3 | | | | |
| A4 | 2.046E−02 | 6.892E−04 | 6.360E−04 | 2.698E−04 |
| A5 | | | | |
| A6 | −7.252E−03 | −4.370E−04 | −5.084E−05 | 2.503E−06 |
| A7 | | | | |
| A8 | 1.203E−03 | 8.895E−05 | 4.289E−07 | −1.129E−07 |
| A9 | | | | |
| A10 | −5.208E−05 | 4.492E−06 | 1.795E−09 | |

The optical system according to Example 2 has a detection-side wavelength band of infrared light (785 nm), as in Example 1, and has an example configuration allowing for detection with higher resolution than Example 1. The optical system according to Example 2 has the same projection-side configuration as Example 1 ([Table 1] and [Table 2]). The optical system according to Example 2 also has the same detection-side magnification as in Example 1 and maintains the telecentric property.

As described above, the common optical system 20 in the projection optical system 1 also serves as the detection-side imaging optical system. In the optical system according to Example 2, the surface P-15 of the projection optical system 1 is identical to the surface I-8 of the detection optical system 2A, as shown in [Table 6]. A surface following the surface I-9 of the detection optical system 2A is on the optical path of the common optical system 20 in the projection optical system 1.

In the optical system according to Example 2, the lens unit 30 of the detection optical system 2A is configured by two aspherical lenses.

FIG. 7 illustrates a spot diagram on the detection side of the optical system according to Example 2. FIG. 8 illustrates an image distortion on the detection side of the optical system according to Example 2. FIG. 8 illustrates the image distortion on the imaging device 200 as a result of calculation in the projection direction (back calculation).

As apparent from FIGS. 7 and 8, the spot diameter is about one-fifth or less of the spot diameter of Example 1, and the image distortion is sufficiently reduced, and thus an improvement is made compared to Example 1.

In the configuration of the optical system according to Example 2, the detection optical system 2A includes two lenses and has an entire length of 26.6 mm. If a branching configuration between the projection system and the detection system is configured as in the comparative example (FIG. 1), three lenses are needed to obtain the performance equivalent to that of the detection system of Example 2. Further, the entire length of the detection side should be increased to 53.6 mm.

Further, as shown in [Table 5] described above, the optical system according to Example 2 satisfies all preferable conditions including other conditions described below. Additionally, as a characteristic feature, the lens disposed most adjacent to the optical path splitting unit 3 (corresponding to the surfaces I-5 and I-6) in the detection optical system 2A has a positive power because a lens having a negative power requires a longer back focus and is thus inappropriate to a reduction in the entire dimensions. Further, in the optical system according to Example 2, the power of the lens disposed most adjacent to the optical path splitting unit 3 in the detection optical system 2A accounts for a large part of the power of the detection optical system 2A, that is, satisfies the following expression.

$$0.5 \leq f_{Img1}/f_{Imgonly} \leq 2 \quad (3)$$

Here, $f_{Img1}$ denotes the focal length of the lens disposed most adjacent to the optical path splitting unit 3 in the detection optical system 2A, and $f_{Imgonly}$ denotes the focal length of the detection optical system 2A between the optical path splitting unit 3 and the imaging device 200 in the detection optical system 2A. In Example 2, $f_{Imgonly}$ corresponds to the focal length of the surfaces I-0 to I-6. If the expression (3) is not satisfied, it is meant that the other lens of the detection optical system 2A has a largely increased power or a largely reduced power. In this case, a correction margin for distortion and telecentric properties decreases, making it difficult to achieve an appropriate design. Further, adding a third lens to the configuration of the detection optical system 2A of Example 2 is highly wasteful in terms of designing.

Additionally, also on the detection side in the optical system according to Example 2, a part corresponding to the detection-side diaphragm St2 for the detection side presents on the optical path between the imaging device 200 and the optical path splitting unit 3, and a point of intersection of the optical axis and a principal ray of each image height exists, as in Example 1.

Further, in the detection optical system 2A, the lens disposed most adjacent to the imaging device 200 has an aspherical surface. This makes it possible to establish a configuration that effectively reduces image distortion.

Further, in the optical system according to Example 2, the distance from the surface P-14 to the surface P-15 is identical to the distance from the surface I-7 to the surface I-8, and the distance from the projection-side diaphragm St1 to the optical path splitting unit 3 is equal to the distance from the detection-side diaphragm St2 to the optical path splitting unit 3.

1.3 Example 3

[Table 8] and [Table 9] show lens data of the detection optical system 2B in an optical system according to Example 3 having an example configuration illustrated in FIG. 9 to which specific numerical values are applied. [Table 9] shows data of the aspherical surface of the detection optical system 2B.

TABLE 8

| Example 3 (Detection optical system) | | | | | | |
|---|---|---|---|---|---|---|
| I-i | Type | Ri | Di | Ndi | vdi | Element |
| I-0 | spherical | ∞ | 0.00 | | | imaging device |
| I-1 | spherical | ∞ | 0.45 | 1.5168 | 64.20 | cover glass |
| I-2 | spherical | ∞ | 1.20 | | | |
| I-3 | aspherical | −2.929 | 1.00 | 1.5163 | 64.07 | |
| I-4 | aspherical | −9.228 | 1.11 | | | |

TABLE 8-continued

Example 3 (Detection optical system)

| I-i | Type | Ri | Di | Ndi | vdi | Element |
|---|---|---|---|---|---|---|
| I-5 | spherical | 3.477 | 1.30 | 1.4970 | 81.61 | |
| I-6 | spherical | −42.877 | 0.70 | 1.8081 | 22.76 | |
| I-7 | spherical | 6.539 | 0.85 | | | |
| I-8 | aspherical | 4.403 | 2.00 | | 64.07 | |
| I-9 | aspherical | −5.411 | 0.15 | 1.5163 | | |
| I-10 | spherical | ∞ | 10.00 | | | detection-side diaphragm (St2) |
| I-11/P-15 | spherical | ∞ | 7.38 | | | optical path splitting unit |
| I-12/P-16 | spherical | 30.587 | 3.80 | 1.4875 | 70.4412 | common optical system (following is omitted) |

TABLE 9

Example 3 (Detection optical system)

| | I-i | | | |
|---|---|---|---|---|
| | I-3 | I-4 | I-8 | I-9 |
| k | 0 | 0 | 0 | −3.448 |
| A1 | | | | |
| A2 | | | | |
| A3 | | | | |
| A4 | 3.495E−02 | 3.691E−02 | 3.404E−03 | 4.454E−03 |
| A5 | | | | |
| A6 | −1.874E−03 | 9.834E−05 | 1.015E−03 | 6.414E−04 |
| A7 | | | | |
| A8 | 3.832E−04 | 5.762E−04 | −1.501E−04 | 3.001E−04 |
| A9 | | | | |
| A10 | −2.292E−05 | −3.495E−05 | 4.454E−05 | |

The optical system according to Example 3 has an example configuration in which the wavelength band on the detection side extends in an expanded region including a visible region (R (red), G (green), and B (blue)) as well as an infrared region (785 nm). The configuration on the projection side of the optical system according to Example 3 is the same as that of Example 1 (see [Table 1] and [Table 2]). Further, in the optical system according to Example 3, the detection-side magnification is the same as that of Example 1, but the telecentric property is largely relaxed. In the optical system according to Example 3, the detection-side telecentric property is almost the same as the design value of an imaging lens of a smartphone. Accordingly, it is desirable that the imaging device 200 used on the detection side of the optical system according to Example 3 be different in specification from the imaging device 200 used on the detection side of the optical system according to Example 1.

As described above, the common optical system 20 in the projection optical system 1 also serves as the detection-side imaging optical system. In the optical system according to Example 3, the surface P-15 of the projection optical system 1 is identical to the surface I-11 of the detection optical system 2B, as indicated in [Table 8]. A surface following the surface I-12 of the detection optical system 2B is on the optical path of the common optical system 20 in the projection optical system 1.

In the optical system according to Example 3, the lens unit 30 of the detection optical system 2A is configured by four lenses.

FIG. 10 illustrates a spot diagram of the detection side of the optical system according to Example 3. FIG. 11 illustrates an image distortion at the detection side of the optical system according to Example 3. FIG. 11 illustrates the image distortion on the imaging device 200 as a result of calculation in the projection direction (back calculation).

As apparent from the spot diagram of FIG. 10, a spot size in the optical system according to Example 3 is about half of that in Example 2, and thus the resolution is further improved. It is to be noted that, although the spot is in the visible region (RGB) for the purpose of simplifying the explanation, the optical system according to Example 3 has a resolution superior to that in Example 2 also in the infrared region (785 nm). Additionally, as apparent from FIG. 11, a slight image distortion is observed in the optical system according to Example 3, but the degree of the distortion is within a level that is sufficiently processable in a signal process, for example.

In the configuration of the optical system according to Example 3, the detection optical system 2B includes four lenses and has an entire length of 18.8 mm, which is shorter than that of the detection optical system 2A of Example 2. If a branching configuration between the projection system and the detection system is configured as in the comparative example (FIG. 1), it is difficult for the detection system to obtain light in the visible region (RGB) in a condition where the S/N ratio is favorable, as described above. Accordingly, the configuration of the optical system according to Example 3 is further particularly advantageous.

Further, as shown in [Table 5] described above, the optical system according to Example 3 satisfies all preferable conditions including other conditions described below. Additionally, also on the detection side in the optical system according to Example 3, a part corresponding to the detection-side diaphragm St2 for the detection side presents on the optical path between the imaging device 200 and the optical path splitting unit 3, and a point of intersection of the optical axis and the principal ray of each image height exists, as in Example 1.

In the optical system according to Example 3, the lens disposed most adjacent to the optical path splitting unit 3 (corresponding to the surfaces I-8 and I-9) in the detection optical system 2B has a positive power. Further, in the optical system according to Example 3, the power of the lens disposed most adjacent to the optical path splitting unit 3 in the detection optical system 2B accounts for a large part of the power of the whole lenses (corresponding to the surfaces I-0 to I-10) of the detection optical system 2B, that is, satisfies the expression (3) described above. For the configuration of the detection optical system 2B in the optical system according to Example 3, there is a concern about an increase in astigmatism particularly when a light flux toward the maximum image height is largely refracted. In particular, the configuration downstream of the detection-side diaphragm St2 may not be changed because it depends on the projection-side lens configuration. Therefore, intentional cancelling of the astigmatism is also likely to be difficult. Accordingly, it is disadvantageous to impart a large power to the second and subsequent lenses from the optical path splitting unit 3 in the detection optical system 2B. It is therefore preferable that the power of the lens disposed most adjacent to the optical path splitting unit 3 accounts for a large part of the power of the detection optical system 2B.

Further, in the detection optical system 2B, the lens disposed most adjacent to the imaging device 200 has an aspherical surface. This makes it possible to establish a structure that efficiently reduces image distortion.

Further, in the optical system according to Example 3, the distance from the surface P-14 to the surface P-15 is identical to the distance from the surface I-10 to the surface I-11, and the distance from the projection-side diaphragm St1 to the optical path splitting unit 3 is equal to the distance from the detection-side diaphragm St2 to the optical path splitting unit 3.

1.4 Modification Examples

Modification examples of the examples described above will now be described.

For example, the portion of the imaging device 200 in each example described above may be replaced with a polarization image sensor or the like to perform polarization imaging. This is an application example that is not achievable in a case where the imaging device 200 is disposed at the position as in the comparative example (FIG. 1). Alternatively, the portion of the imaging device 200 in each example described above may be replaced with a ToF (time of flight) image sensor, and a ToF light emitting source may be disposed at another position (for example, above the projector), to achieve depth sensing in an integrated form with the projector. Alternatively, the optical path on the detection side is split at another position, and the ToF light emitting source may be disposed at the other splitting portion (FIG. 12).

FIG. 12 illustrates a configuration of an optical system according to Modification Example 1.

The optical system according to Modification Example 1 differs from the optical system according to Example 3 (FIG. 9) in the configuration in the vicinity of the detection optical system 2C. The optical system according to Modification Example 1 differs from the optical system according to Example 3 (FIG. 9) in that a ToF image sensor 200A is used instead of the imaging device 200, and a ToF light emitting source unit 4 and an optical path splitting unit 5 are further provided. The ToF light emitting source unit 4 includes a ToF light emitting source 210.

In the optical system according to Modification Example 1, the optical path splitting unit 5 performs splitting into an optical path of irradiation light from the ToF light emitting source 210 and an optical path of object light toward the imaging device 200A through polarization. Further, splitting into the projection-side optical path and the detection-side optical path are achieved by using a polarizing beam splitter as the optical path splitting unit 3. The polarizing beam splitter has a polarization separation function with respect to visible light and has a transmitting function with respect to infrared light (a reflecting function in the configuration illustrated in FIG. 13 described below). Alternatively, a half mirror may be used as the optical path splitting unit 5 to perform splitting into the optical path of the irradiation light from the ToF light emitting source 210 and the optical path of the object light toward the imaging device 200A. Alternatively, a polarizing beam splitter covering from the visible region to the infrared region may be used as the optical path splitting unit 3 to perform splitting into the projection-side optical path and the detection-side optical path.

Further, the ToF light emitting source 210 in the configuration illustrated in FIG. 12 may be replaced with an infrared light emitting source that emits infrared light for object detection. In this case, the entire projection surface may be irradiated with infrared light for object detection without a need for an infrared light emitting source disposed outside the projector. This eliminates the need for an infrared light emitting source disposed outside when object detection is performed using infrared light. This largely improves the design and is advantageous in downsizing.

FIG. 13 illustrates an optical system according to Modification Example 2. The optical system according to Modification Example 2 differs from the optical system according to Example 3 (FIG. 9) in that the reflection functions of the optical path splitting unit 3 with respect to the projection system and the detection system are inverted. In the optical system according to Modification Example 2, the optical path of the detection system is bent at the middle of thereof by the reflection function of the optical path splitting unit 3.

In Examples and Modification Example 1 described above, the optical path splitting unit 3 is not limited to a plate-like beam splitter, and may be, for example, a prism-like beam splitter. In consideration of transmissivity and reflectivity, a prism-like beam splitter is preferred. In consideration of costs, a plate-like beam splitter is preferred. The configuration of the optical path splitting unit 3 may be selected as appropriate depending on performance specifications or costs. Further, the optical path splitting unit 3 may be a polarizing beam splitter rather than a simple beam splitter. This allows for imaging on the detection side while suppressing the loss of light quantity on the projector side. In a case of a configuration in which the polarizing beam splitter is used as the optical path splitting unit 3 and where light on the projection side is reflected by the optical path splitting unit 3, as in, particularly, Examples 1 to 3, it is desirable that the projection-side polarized light incident on the polarizing beam splitter be S-polarized light in consideration of the reflectivity design. In contrast, in a case where the reflection configurations of the optical path splitting unit 3 in the projection system and the detection system are inverted as illustrated in FIG. 13, for example, it is more desirable that the projection-side polarized light incident on the polarizing beam splitter be P-polarized light.

Note that, in the projection system in the configuration of FIG. 13, light passes through a diagonal plate member (the optical path splitting unit 3). This gives influences of comatic aberration and astigmatism to the projection side. Although the degree of the influences is assumed to be low, image signal correction on the projection side may be generally difficult to be performed. In this regard, it is considered that a load of the signal processing on the projection side is smaller in the configuration of FIG. 9. Note that, in the configuration of FIG. 9 in contrast, although the diagonal plate member (the optical path splitting unit 3) gives the influences of the cosmic aberration and astigmatism to the detection system, it is relatively easy to process detection signals.

FIG. 14 illustrates a main configuration of the projection optical system 1. It is desirable that the configuration of FIG. 9 satisfy the following expression (A) to sufficiently reduce the astigmatism in the detection system. Here, out of the plurality of lenses in the projection optical system 1, the first lens disposed on the side of the projection surface relative to the optical path splitting unit 3 (the first lens of the common optical system 20 in a direction toward the light valve 100) is represented by $L_{common1}$. Further, the light-valve side focal position of the optical system portion (common optical system 20) on the side of the projection surface relative to the optical path splitting unit 3 in the projection optical system 1 is represented by $P_{common}$. Further, the distance from an incident surface of the lens $L_{common1}$ in the direction toward the light valve 100 to the light-valve side focal position $P_{common}$ is represented by $BFL_{common}$, and an absolute value thereof is represented by $|BFL_{common}|$.

$$|BFL_{common}| \geq 100 \text{ mm} \quad (A)$$

As illustrated in FIG. 14, light parallel to the optical axis (paraxial ray) is emitted from the projection side, and a point of image formation on the light-valve side only by the common optical system 20 is located at $P_{common}$. Although the image height is illustrated in an enlarged manner in FIG. 14 because of difficulty in illustration, it is to be noted that the calculation using the expression (A) is actually based on the light ray on the optical axis.

The term "point of image formation on the light-valve side" refers to an image formation point as a result of the emission of the paraxial parallel light from the projection direction, and does not refer to a spatial position. In FIG. 14, since the light ray from the lens $L_{common1}$ of the common optical system 20 (the surfaces P-16 and P-17 of [Table 1]) toward the light valve 100 is slightly diverging light, the position of $P_{common}$ at which a virtual image is formed is on the far side (right side) of a concave mirror M1.

The necessity of the expression (A) is relevant to the ratio to the astigmatic difference amount generated at the diagonal plate member (the optical path splitting unit 3). Given that the cos of the angle of a light ray incident on the diagonal plate member is $\xi$, the cos of the refraction angle of the diagonal plate member is $\xi'$, the thickness of the diagonal plate member is d, and the refractive index is n, the astigmatic difference amount $\Delta$ is represented by the following expression (B).

[Expression 2]

$$\Delta = \frac{d}{n\xi'}\left(1 - \frac{\xi^2}{\xi'^2}\right) \quad (B)$$

For example, when the angle of a light ray incident on the diagonal plate member is 70 deg, d is 0.7 mm, and n is 1.52 in the expression (B), $\Delta$ is 0.48 mm. As the astigmatic difference amount $\Delta$ becomes relatively smaller with respect to $BFL_{common}$, the influence of the astigmatism is reduced. For favorable image formation, it is basically necessary to satisfy $\Delta/|BFL_{common}| \leq 0.5\%$.

Since all of the numerical values given in the above assumption are close to the lower limits, at least $$|BFL_{common}| \geq 100 \text{ mm}$$

should be satisfied. If not, it is difficult to obtain favorable detection signals when the diagonal plate member is disposed to meet the requirements of astigmatism. The value of $BFL_{common}$ of each example is shown in [Table 5] described above. The value of $BFL_{common}$ corresponds to the distance between the back focal point of the optical system portion of the surfaces P-16 to P-27 in [Table 1] and the surface P-16.

Further, to obtain light in the visible region (RGB) in the detection system, an optical notch filter may be disposed on the detection side to cut the wavelength band of projection light. This makes it possible to obtain an image not affected by the projection light.

Further, the back focus on the projection side is formed in a telecentric form in each example described above, but may be formed in a non-telecentric form. It is also possible to establish a configuration in which the polarizing separation element 101 is not disposed at the back focus. Further, in each example described above, it is assumed that the size of the projection-side diaphragm St1 is the same as the size of the detection-side diaphragm St2; however, these size are not necessarily the same. For example, the size of the detection-side diaphragm St2 is reduced to increase the F number on the detection side. This makes it possible to further reduce the manufacturing sensitivity of the lenses and further reduce the number of lenses. Further, it is desirable that the focusing mechanism of a projection size be disposed in the common optical system 20. In the optical systems according to Examples 1 to 3, it is desirable that the part of the lenses, P-16 to P-21 in [Table 1], be focusing lenses, for example. By disposing the focusing mechanism in the common optical system 20, it is possible to achieve a simple configuration in which there is no need to move the focus independently on each of the projection side and the detection side. Further, it is possible to correct the image distortion on the detection side to a certain degree through signal processing. Therefore, the configuration is also applicable to a case where the image distortion is larger than those in the optical systems according to Examples 1 to 3.

Formulation of Splitting Position

The position at which the optical path is split by the optical path splitting unit 3 should satisfy a certain condition in the optical path of the projection optical system 1. If not, it is structurally difficult to fold the optical path. Meanwhile, if the splitting position is too far from the projection-side diaphragm St1, for example, the optical path splitting unit 3 becomes huge, which hinders downsizing.

FIG. 15 illustrates a main configuration in the vicinity of the optical path splitting unit 3 in the optical system according to Example 3.

An optimum positional condition of the optical path splitting unit 3 is examined with reference to FIG. 15. The distance from the projection-side diaphragm St1 to the optical path splitting unit 3 on the optical axis is represented by A. The distance from the first lens $L_{common1}$ on the side of the projection surface relative to the optical path splitting unit 3 to the optical path splitting unit 3 on the optical axis is represented by B. Further, in the projection optical system 1, the opening angle of a marginal ray on the axis is represented by $\varphi$, and the angle of emergence of the maximum image height on the projection-side diaphragm St1 is represented by $\theta$. Further, given that the position of the projection-side diaphragm St1 is $$(X_{sto}, Y_{sto}) = (0, f_{prjonly} \tan \varphi),$$

the edge position of the lens $L_{common1}$ after the reflection by the optical path splitting unit 3 may be basically defined as $$(X_{LMA1}, Y_{LMA1}) \approx (A - (A+B)\tan \theta - f_{Prjonly} \tan \varphi, B).$$

The distance L between two points (Xsto, Ysto) and $(X_{LMA1}, Y_{LMA1})$ should be a predetermined value or more, basically 3 mm or more. If not, it is difficult to arrange the optical path splitting unit 3 and the lenses in the vicinity of the optical path splitting unit 3 without causing interference between them. Accordingly, the following expression (4) is satisfied.

[Expression 3]

$$L = \sqrt{\{A - (A+B)\tan\theta - f_{prjonly}\tan\phi\}^2 + (B - f_{prjonly}\tan\phi)^2} \geq 3[\text{mm}] \quad (4)$$

When the opening angle $\varphi$ of the marginal ray is a low angle, the following expression (5) is basically satisfied:

$$\tan \varphi = 1/(2F) \quad (5)$$

where F denotes the F number of the projection optical system 1.

Further, the angle of emergence θ satisfies the following expression (6):

$$\tan \theta = y_{max}/f_{prjonly} \quad (6)$$

where $y_{max}$ denotes the maximum image height of an image produced by the light valve 100 (corresponding to hmax in FIG. 3). Accordingly, the expression (4) may be rewritten as the following expression (4-2).

[Expression 4]

$$L = \sqrt{\left\{A - (A+B)\frac{y_{max}}{f_{prjonly}} - \frac{f_{prjonly}}{2F}\right\}^2 + \left(B - \frac{f_{prjonly}}{2F}\right)^2} \geq 3[\text{mm}] \quad (4\text{-}2)$$

The resulting values of the calculation using the expression (4-2) for each example are shown in [Table 5] described above. Here, in [Table 1], A corresponds to the surfaces P-14 and P-15, and B corresponds to the surfaces P-15 and P-16. In each example, the distance L between the two points in the expression (4-2) is greater than a target value, 3 mm. Accordingly, it is possible for each example to achieve a configuration in which physical interference between the plurality of lenses in the vicinity of the optical path splitting unit 3 is prevented in the portion of the distance L between the two points even if a lens frame is formed. Further, if the distance L between the two points is too large, the entire dimensions of the optical system inevitably increases. Considering of an increase in size of the optical path splitting unit 3 and the length of the detection system, it is desirable that the distance L between the two points basically satisfy $$L \leq 15 \quad (7).$$

Now, if the distance L exceeds the threshold represented by the expression (7), and A and B in the expression (4-2) proportionally increase, the numerical value of A in Examples 1 to 3 determined through conversion of the values shown in [Table 5] is 35.7 mm, which is increased by 25.7 mm. The numerical value is substantially the same as the total length of the conventional example which is reduced in Example 2. Thus, the significance of application of the present technology is considered to be reduced. Accordingly, it is desirable that the distance L be less than the expression (7). Note that increasing the value B in the proportional conversion suppresses an increase in the entire length of the detection side; however, this, in turn, uselessly increases the entire length of the projection optical system 1. Accordingly, it is a never-changing fact that the above-described range is preferable.

1.5 Effects

With the optical system or the projector according to one embodiment of the present disclosure, the optical path splitting unit 3 is disposed at an optimized position in the projection optical system 1, and object light is incident on the detection optical system 2 through the optical path splitting unit 3. Accordingly, it is possible to achieve object detection with a compact configuration and high detection performance.

Specifically, according to the embodiment, it is possible to simplify and downsize a complicated lens configuration of a conventional detection system. Further, unwanted background light incident on the detection system is eliminated in the first place, which makes it possible to improve the S/N ratio of a signal to be detected. Additionally, it is possible to achieve the system also configured to detect RGB visible light. Moreover, it is also possible to establish the system applicable to the detection of light in a visible region and an infrared region. Since the branching position between the projection system and the detection system may be located at a portion different form a splitting position of illumination light, the embodiment may have a very large application range including application to polarization sensing, depth sensing using ToF, or illumination of the projection surface with infrared light. Since the detection system is simplified, the cost is low, too. Unlike a projection optical system having an extended back focus, the embodiment is characterized by a small projection lens.

It is to be noted that the effects described herein are merely illustrative, and are not limited thereto. There may be any effects other than the effects described herein.

2. Other Embodiments

The technology of the present disclosure should not be limited to the description in the foregoing embodiments and examples, and various modification may be implemented.

For example, the shape and numerical value of each component described in each of the foregoing numerical examples are mere examples for achieving the present technology, and the technical scope of the present technology should not be interpreted as being limited to the description.

Further, the surface forming an aspherical surface is not limited to the lens surface described in each example. Another configuration may be applied in which a surface other than the lens surface described in each example is further made into an aspherical surface.

Moreover, the present technology may have the following configurations, for example.

According to the present technology having the following configuration, the optical path splitting unit is disposed at an optimized position in the projection optical system, and objection light is incident on the detection optical system through the optical path splitting unit. Accordingly, it is possible to achieve object detection with a compact configuration and high detection performance.

[1]

An optical system including:
  a projection optical system that includes a plurality of lenses and projects, on a projection surface, an image generated by a light valve disposed on a first optical path, and on which object light entering from a detection object is incident, the detection object being disposed on side of the projection surface, the object light being incident from the side of the projection surface;
  an optical path splitting unit that is disposed on the side of the projection surface relative to one of the plurality of lenses disposed most adjacent to the light valve in the projection optical system, and splits an optical path into the first optical path and a second optical path different from the first optical path; and
  a detection optical system that includes at least one lens disposed between an imaging device and the optical path splitting unit on the second optical path, on which the object light is incident through the optical path splitting unit, and that forms an image of the detection object on an imaging surface of the imaging device.

[2]
The optical system according to [1] described above, further including
an illumination optical system that emits illumination light to the light valve, in which
the optical path splitting unit is disposed at a position on an optical path of the projection optical system and not crossing an optical path of the illumination optical system.

[3]
The optical system according to [1] or [2] described above, in which
the optical path splitting unit is disposed between any two lenses out of the plurality of lenses in the projection optical system.

[4]
The optical system according to any one of [1] to [3] described above, in which
the at least one lens of the detection optical system includes at least one aspherical lens.

[5]
The optical system according to any one of [1] to [4] described above, in which
the detection optical system forms an image of the detection object as the object light using infrared light or visible light.

[6]
The optical system according to any one of [1] to [5] described above, in which $$0 < f_{Imgonly} < f_{Prjonly}$$

is satisfied,
where $f_{Prjonly}$ denotes a focal length of a lens disposed on an optical path between the optical path splitting unit and the light valve in the projection optical system, and
$f_{Imgonly}$ denotes a focal length of the detection optical system between the optical path splitting unit and the imaging device in the detection optical system.

[7]
The optical system according to any one of [1] to [6] described above, in which
the detection optical system has two or more lenses, and out of the two or more lenses, at least one lens disposed most adjacent to the imaging device is an aspherical lens.

[8]
The optical system according to any one of [1] to [7] described above, in which $$|BFL_{common}| \geq 100 \text{ (mm)}$$

is satisfied,
where $L_{common1}$ denotes a first lens out of the plurality of the lenses in the projection optical system, the first lens being disposed on the side of the projection surface relative to the optical path splitting unit,
$P_{common}$ denotes a light-valve side focal position of an optical system portion on the side of the projection surface relative to the optical path splitting unit in the projection optical system, and
$BFL_{common}$ denotes a distance from a lens surface of the lens $L_{common1}$ on a side of the light valve to the light-valve side focal position.

[9]
The optical system according to any one of [1] to [8] described above, in which
a point of intersection of an optical axis and a principal ray exists between the imaging device and the optical path splitting unit in the detection optical system.

[10]
The optical system according to any one of [1] to [9] described above, in which
the detection optical system has two or more lenses, and out of the two or more lenses, one lens disposed most adjacent to the optical path splitting unit has a positive power.

[11]
The optical system according to any one of [1] to [10] described above, in which $$0.5 \leq f_{Img1}/f_{Imgonly} \leq 2$$

is satisfied,
where $f_{Img1}$ denotes a focal distance of a lens disposed most adjacent to the optical path splitting unit in the detection optical system, and
$f_{Imgonly}$ denotes a focal distance of the detection optical system between the optical path splitting unit and the imaging device in the detection optical system.

[12]
The optical system according to any one of [1] to [11] described above, in which
the projection optical system includes a projection-side diaphragm on side of the light valve relative to the optical path splitting unit,
the detection optical system includes a detection-side diaphragm on side of the imaging device relative to the optical path splitting unit, and
a distance from the projection-side diaphragm to the optical path splitting unit on the optical axis is identical to a distance from the detection-side diaphragm to the optical path splitting unit on the optical axis.

[13]
The optical system according to any one of [1] to [12] described above, in which $$PL/PH \leq 0.42$$

is satisfied,
where PL denotes a distance of projection by the projection optical system, and PH denotes a horizontal size of a projection image on the projection surface.

[14]
The optical system according to any one of [1] to [13] described above, in which
the projection optical system includes a projection-side diaphragm on side of the light valve relative to the optical path splitting unit, and
the following expression is satisfied $$L = \sqrt{\left\{A - (A+B)\frac{y_{max}}{f_{prjonly}} - \frac{f_{prjonly}}{2F}\right\}^2 + \left(B - \frac{f_{prjonly}}{2F}\right)^2} \quad \text{[Expression 5]}$$

$$3 \leq L \leq 15$$

where A denotes a distance from the projection-side diaphragm to the optical path splitting unit on an optical axis,
B denotes a distance from a first lens out of the plurality of lenses in the projection optical system to the optical path splitting unit on the optical axis, the first lens being disposed on the side of the projection surface relative to the optical path splitting unit is, F denotes F number of the projection optical system, and $y_{max}$ denotes a maximum image height of an image generated by the light valve.

[15]

The optical system according to any one of [1] to [4] or [6] to [14] described above, in which the detection optical system forms an image of the detection object as the object light using infrared light and visible light.

[16]

The optical system according to any one of [1] to [15] described above, in which the optical path splitting unit is a polarizing beam splitter.

[17]

The optical system according to [16] described above, in which the optical path splitting unit has a polarization separation function with respect to visible light, and a transmitting function and a reflecting function with respect to infrared light.

[18]

A projector including:
an optical system;
a light valve; and
an imaging device, in which
the optical system includes
a projection optical system that includes a plurality of lenses and projects, on a projection surface, an image generated by a light valve disposed on a first optical path, and on which object light entering from a detection object is incident, the detection object being disposed on side of the projection surface, the object light being incident from the side of the projection surface,
an optical path splitting unit that is disposed on the side of the projection surface relative to one of the plurality of lenses disposed most adjacent to the light valve in the projection optical system, and splits an optical path into the first optical path and a second optical path different from the first optical path; and
a detection optical system that includes at least one lens disposed between the imaging device and the optical path splitting unit on the second optical path, on which the object light is incident through the optical path splitting unit, and that forms an image of the detection object on an imaging surface of the imaging device.

This application claims the benefits of Japanese Priority Patent Application JP 2018-074754 filed with the Japan Patent Office on Apr. 9, 2018, the entire contents of which are incorporated herein by reference.

It should be understood that those skilled in the art could conceive various modifications, combinations, sub-combinations, and alterations depending on design requirements and other factors, insofar as they are within the scope of the appended claims or the equivalents thereof.

The invention claimed is:

1. An optical system, comprising:
a projection optical system configured to project an image on a projection surface, wherein
the project optical system includes a plurality of lenses,
the image is generated by a light valve on a first optical path,
object light from a detection object is incident on the projection optical system,
the detection object is on a side of the projection surface, and
the object light is incident from the side of the projection surface;
an optical path splitting unit on the side of the projection surface relative to one of the plurality of lenses, wherein
the one of the plurality of lenses is most adjacent to the light valve in the projection optical system,
the one of the plurality of lenses is between the light valve and the optical path splitting unit; and
the optical path splitting unit is configured to split an optical path into the first optical path and a second optical path different from the first optical path; and
a detection optical system that includes at least one lens between an imaging device and the optical path splitting unit on the second optical path, wherein
the object light is incident on the at least one lens through the optical path splitting unit,
the at least one lens is different from the one of the plurality of lenses; and
the detection optical system is configured to form an image of the detection object on an imaging surface of the imaging device.

2. The optical system according to claim 1, further comprising
an illumination optical system configured to emit illumination light to the light valve, wherein
the optical path splitting unit is at a position on an optical path of the projection optical system and not crossing an optical path of the illumination optical system.

3. The optical system according to claim 1, wherein
the optical path splitting unit is between two lenses of the plurality of lenses in the projection optical system.

4. The optical system according to claim 1, wherein
the at least one lens of the detection optical system includes an aspherical lens.

5. The optical system according to claim 1, wherein
the detection optical system is further configured to form the image of the detection object based on the object light,
the object light is at least one of infrared light or visible light.

6. The optical system according to claim 1, wherein $$0 < f_{Imgonly} < f_{Prjonly}$$

is satisfied,
where $f_{Prjonly}$ denotes a focal length of a lens on the first optical path between the optical path splitting unit and the light valve in the projection optical system, and
$f_{Imgonly}$ denotes a focal length of the detection optical system between the optical path splitting unit and the imaging device in the detection optical system.

7. The optical system according to claim 1, wherein
the detection optical system has at least two lenses,
the at least one lens of the at least two lenses is an aspherical lens, and
the at least one lens of the at least two lenses is most adjacent to the imaging device.

8. The optical system according to claim 1, wherein $$|BFL_{common}| \geq 100 \text{ mm}$$

is satisfied,
where $L_{common1}$ denotes a first lens out of the plurality of the lenses in the projection optical system, the first lens is on the side of the projection surface relative to the optical path splitting unit, $P_{common}$ denotes a light-valve side focal position of an optical system portion on the side of the projection surface relative to the optical path splitting unit in the projection optical system, and $BFL_{common}$ denotes a distance from a lens surface of the lens $L_{common1}$ on a side of the light valve to the light-valve side focal position $P_{common}$.

9. The optical system according to claim 1, wherein
a point of intersection of an optical axis and a principal ray is between the imaging device and the optical path splitting unit in the detection optical system.

10. The optical system according to claim 1, wherein
the detection optical system has at least two lenses,
the at least one lens of the at least two lenses has a positive power, and
the at least one lens of the at least two lenses is most adjacent to the imaging device.

11. The optical system according to claim 1, wherein $$0.5 \leq f_{Img1}/f_{Imgonly} \leq 2$$

is satisfied,
wherein
$f_{Img1}$ denotes a focal distance of a lens most adjacent to the optical path splitting unit in the detection optical system, and
$f_{Imgonly}$ denotes a focal distance of the detection optical system between the optical path splitting unit and the imaging device in the detection optical system.

12. The optical system according to claim 1, wherein
the projection optical system includes a projection-side diaphragm on a side of the light valve relative to the optical path splitting unit,
the detection optical system includes a detection-side diaphragm on a side of the imaging device relative to the optical path splitting unit, and
a distance from the projection-side diaphragm to the optical path splitting unit on an optical axis is identical to a distance from the detection-side diaphragm to the optical path splitting unit on the optical axis.

13. The optical system according to claim 1, wherein $$PL/PH \leq 0.42$$

is satisfied,
where:
PL denotes a distance of projection by the projection optical system, and
PH denotes a horizontal size of a projection image on the projection surface.

14. The optical system according to claim 1, wherein
the projection optical system includes a projection-side diaphragm on a side of the light valve relative to the optical path splitting unit, and
the following expression is satisfied $$L = \sqrt{\left\{A - (A+B)\frac{y_{max}}{f_{prjonly}} - \frac{f_{prjonly}}{2F}\right\}^2 + \left(B - \frac{f_{prjonly}}{2F}\right)^2} \quad \text{[Expression 1]}$$

$$3 \leq L \leq 15$$

where:
A denotes a distance from the projection-side diaphragm to the optical path splitting unit on an optical axis,
B denotes a distance from a first lens out of the plurality of lenses to the optical path splitting unit on the optical axis, wherein the first lens is on the side of the projection surface relative to the optical path splitting unit,
F denotes F number of the projection optical system,
$y_{max}$ denotes a maximum image height of the image generated by the light valve, and
$f_{Prjonly}$ denotes a focal length of a lens on the first optical path between the optical path splitting unit and the light valve in the projection optical system.

15. The optical system according to claim 1, wherein
the detection optical system is further configured to form an image of the detection object based on the object light,
the object light comprises both infrared light and visible light.

16. The optical system according to claim 1, wherein
the optical path splitting unit comprises a polarizing beam splitter.

17. The optical system according to claim 16, wherein
the optical path splitting unit has a polarization separation function with respect to visible light, and a transmitting function and a reflecting function with respect to infrared light.

18. A projector, comprising:
an optical system;
a light valve; and
an imaging device, wherein
the optical system includes:
  a projection optical system configured to project an image on a projection surface, wherein
    the project optical system includes a plurality of lenses,
    the image is generated by the light valve on a first optical path,
    object light from a detection object is incident on the projection optical system,
    the detection object is on a side of the projection surface, and
    the object light is incident from the side of the projection surface,
  an optical path splitting unit on the side of the projection surface relative to one of the plurality of lenses, wherein
    the one of the plurality of lenses is most adjacent to the light valve in the projection optical system,
    the one of the plurality of lenses is between the light valve and the optical path splitting unit; and
    the optical path splitting unit is configured to split an optical path into the first optical path and a second optical path different from the first optical path; and
  a detection optical system that includes at least one lens between the imaging device and the optical path splitting unit on the second optical path, wherein
    the object light is incident on the at least one lens through the optical path splitting unit,
    the at least one lens is different from the one of the plurality of lenses, and
    the detection optical system is configured to form an image of the detection object on an imaging surface of the imaging device.

* * * * *